United States Patent
Seok

(10) Patent No.: US 9,918,342 B2
(45) Date of Patent: Mar. 13, 2018

(54) METHOD AND DEVICE FOR TRANSMITTING/RECEIVING FRAME IN ACCORDANCE WITH BANDWIDTH THEREOF IN WLAN SYSTEM

(71) Applicant: LG ELECTRONICS INC., Seoul (KR)

(72) Inventor: Yongho Seok, Anyang-si (KR)

(73) Assignee: LG ELECTRONICS INC., Seoul (KR)

( * ) Notice: Subject to any disclaimer, the term of this patent is extended or adjusted under 35 U.S.C. 154(b) by 88 days.

(21) Appl. No.: 14/768,024

(22) PCT Filed: Oct. 30, 2013

(86) PCT No.: PCT/KR2013/009730
§ 371 (c)(1),
(2) Date: Aug. 14, 2015

(87) PCT Pub. No.: WO2014/126324
PCT Pub. Date: Aug. 21, 2014

(65) Prior Publication Data
US 2015/0382333 A1    Dec. 31, 2015

Related U.S. Application Data

(60) Provisional application No. 61/765,060, filed on Feb. 15, 2013, provisional application No. 61/766,114, (Continued)

(51) Int. Cl.
*H04W 4/00* (2009.01)
*H04L 12/28* (2006.01)
(Continued)

(52) U.S. Cl.
CPC ....... *H04W 74/0808* (2013.01); *H04L 1/1671* (2013.01); *H04L 27/0006* (2013.01); (Continued)

(58) Field of Classification Search
None
See application file for complete search history.

(56) References Cited

U.S. PATENT DOCUMENTS 7,177,661 B2    2/2007    Shpak
7,924,801 B2    4/2011    Kang et al.
(Continued)

FOREIGN PATENT DOCUMENTS

CN    100423506    10/2008
CN    101405995    4/2009
(Continued)

OTHER PUBLICATIONS

IEEE Computer Society, "Wireless Lan Medium Access Control (MAC) and Physical Layer (PHY) Specifications" in MAC ad-hoc, IEEE Std 802.11, Mar. 29, 2012, 2793 pages.
(Continued)

*Primary Examiner* — Lonnie Sweet
(74) *Attorney, Agent, or Firm* — Lee Hong Degerman Kang Waimey

(57) ABSTRACT

The present invention relates to a wireless communication system and, more specifically, provides a method and device for transmitting/receiving a frame in accordance with the bandwidth thereof in a WLAN system. The method for performing a response process in a WLAN system according to one embodiment of the present invention may comprise: a step in which a first station (STA) transmits a frame requesting a response frame to a second STA; and a step in which the first STA awaits the response frame for an ACKTimeout interval. The value of the ACKTimeout interval may be determined differently according to the preamble channel bandwidth type of the frame.

16 Claims, 15 Drawing Sheets

(a)

(b)

Related U.S. Application Data filed on Feb. 18, 2013, provisional application No. 61/803,073, filed on Mar. 18, 2013, provisional application No. 61/842,959, filed on Jul. 3, 2013.

(51) Int. Cl.

| | | |
|---|---|---|
| *H04L 12/56* | (2006.01) | |
| *H04W 74/08* | (2009.01) | |
| *H04L 27/00* | (2006.01) | |
| *H04L 1/16* | (2006.01) | |
| *H04W 72/04* | (2009.01) | |
| *H04W 80/02* | (2009.01) | |
| *H04L 5/00* | (2006.01) | |
| *H04W 84/12* | (2009.01) | |

(52) U.S. Cl.
CPC ..... *H04W 72/044* (2013.01); *H04W 72/0406* (2013.01); *H04W 72/0446* (2013.01); *H04W 74/0816* (2013.01); *H04L 5/0053* (2013.01); *H04W 80/02* (2013.01); *H04W 84/12* (2013.01)

(56) References Cited

U.S. PATENT DOCUMENTS

| | | | |
|---|---|---|---|
| 8,060,796 B2 | 11/2011 | Wang et al. | |
| 8,295,259 B1* | 10/2012 | Bagchi | H04L 49/90 370/338 |
| 2002/0071448 A1 | 6/2002 | Cervello et al. | |
| 2004/0142696 A1* | 7/2004 | Saunders | H04B 1/715 455/450 |
| 2009/0010199 A1 | 1/2009 | Adachi et al. | |
| 2009/0303888 A1 | 12/2009 | Ariyur et al. | |
| 2012/0147804 A1 | 6/2012 | Hedayat et al. | |
| 2012/0327870 A1 | 12/2012 | Grandhi et al. | |
| 2013/0077484 A1* | 3/2013 | Zhao | H04W 4/005 370/230 |
| 2013/0083762 A1 | 4/2013 | Adachi et al. | |
| 2013/0155976 A1* | 6/2013 | Chen | H04W 72/0453 370/329 |
| 2013/0188619 A1* | 7/2013 | Dinan | H04W 56/0005 370/336 |
| 2013/0223427 A1 | 8/2013 | Sohn et al. | |
| 2013/0235860 A1* | 9/2013 | Vermani | H04W 28/06 370/338 |
| 2013/0272198 A1* | 10/2013 | Azizi | H04W 72/02 370/328 |
| 2014/0233478 A1 | 8/2014 | Wentink et al. | |
| 2015/0009978 A1 | 1/2015 | Choi et al. | |

FOREIGN PATENT DOCUMENTS

| | | |
|---|---|---|
| CN | 102695286 | 9/2012 |
| EP | 1681807 | 7/2006 |
| EP | 2106166 | 9/2009 |
| JP | 2016513415 | 5/2016 |
| KR | 20040100331 | 12/2004 |
| KR | 10-2005-0040454 | 5/2005 |
| KR | 10-2005-0100951 | 10/2005 |
| KR | 1020060078209 | 7/2006 |
| KR | 10-0684167 | 2/2007 |
| KR | 100703686 | 4/2007 |
| KR | 1020070057622 | 6/2007 |
| KR | 10-0849623 | 7/2008 |
| KR | 20120079741 | 7/2012 |
| RU | 2350026 | 3/2009 |
| RU | 2463736 | 10/2012 |
| WO | 2010/085069 | 7/2010 |
| WO | 2012/027614 | 3/2012 |
| WO | 2012/064502 | 5/2012 |
| WO | 2012124949 | 9/2012 |
| WO | 2012159082 | 11/2012 |
| WO | 2013/022254 | 2/2013 |
| WO | 2014130702 | 8/2014 |

OTHER PUBLICATIONS

Choi, et al., "Definitions of ACK and CTS Timeout", doc.: IEEE 802.11-02/313r0, May 2002, 8 pages.

Lv Kaiying, et al., "MAC Header Design for Small Data Packet for 802.11ah", doc.: IEEE 802.11-12/0094r2, Jan. 2012, 12 pages.

Cariou et al., "Short Ack", doc.: IEEE 802.11-12/0109r0, Jan. 2012, 14 pages.

Wong, et al., "Speed Frame Exchange", doc.: IEEE 802.11-12/0834r0, Jul. 2012, 18 pages.

Park, "Proposed Specification Framework for TGah D10.x", doc.: IEEE 802.11-12/1158r0, XP68039910, Sep. 2012, 36 pages.

European Patent Office Application Serial No. 13874908.0, Search Report dated Sep. 7, 2016, 8 pages.

European Patent Office Application Serial No. 13875029.4, Search Report dated Sep. 7, 2016, 9 pages.

Russian Federation Federal Service for Intellectual Property, Patents and Trademarks Application Serial No. 2015139153/08(060040), Notice of Allowance dated Nov. 23, 2016, 10 pages.

Eldad, Perahia, Intel Corporation, "TGn LB97 Submission for PHY Time and miscellaneous CIDs," IEEE 802.11-07/2033r00, Jun. 25, 2007, 5 pages.

Tomoko Adachi, Toshiba Corporation, "TGn LB97 Submission for Category "backoff" in MAC ad-hoc," IEEE 802.11-07/0636r12, Apr. 17, 2007, 6 pages.

PCT International Application No. PCT/KR2013/009730, Written Opinion of the International Searching Authority dated Jan. 29, 2014, 19 pages.

PCT International Application No. PCT/KR2013/009727, Written Opinion of the International Searching Authority dated Feb. 12, 2014, 15 pages.

Wong, et al., "Draft Standard for Information technology—Telecommunications and information exchange between systems Local and metropolitan area networks—Specific requirements", IEEE 802.11-13/0500r0, May 2013, 330 pages.

Asterjadhi, et al., Comment Resolution for Subclauses 9.3.2 (Part 1), IEEE 802.11-13/0821r2, Jul. 2013, 11 pages.

The State Intellectual Property Office of the People's Republic of China Application Serial No. 201380073152.8, Office Action dated Dec. 26, 2017, 8 pages.

The State Intellectual Property Office of the People's Republic of China Application Serial No. 201380072907.2, Office Action dated Dec. 28, 2017, 6 pages.

Yeow, et al., "Block ACK Transmission", IEEE 802.11-12/0662r2, May 2012, 14 pages.

\* cited by examiner

ACKTimeout = SIFS + Slot Time + PHY - RX - START -Delay (a)　　　　　　　　　　　　(b)

METHOD AND DEVICE FOR TRANSMITTING/RECEIVING FRAME IN ACCORDANCE WITH BANDWIDTH THEREOF IN WLAN SYSTEM

CROSS-REFERENCE TO RELATED APPLICATIONS

This application is the National Stage filing under 35 U.S.C. 371 of International Application No. PCT/KR2013/009730, filed on Oct. 30, 2013, which claims the benefit of U.S. Provisional Application Nos. 61/765,060, filed on Feb. 15, 2013, 61/766,114, filed on Feb. 18, 2013, 61/803,073, filed on Mar. 18, 2013 and 61/842,959, filed on Jul. 3, 2013, the contents of which are all hereby incorporated by reference herein in their entirety.

TECHNICAL FIELD

The following description relates to a wireless communication system and, more particularly, to a method and apparatus for transmitting and receiving a frame according to a bandwidth in a Wireless Local Access Network (WLAN) system.

BACKGROUND ART

Various wireless communication technologies systems have been developed with rapid development of information communication technologies. WLAN technology from among wireless communication technologies allows wireless Internet access at home or in enterprises or at a specific service provision region using mobile terminals, such as a Personal Digital Assistant (PDA), a laptop computer, a Portable Multimedia Player (PMP), etc. on the basis of Radio Frequency (RF) technology.

In order to obviate limited communication speed, one of the advantages of WLAN, the recent technical standard has proposed an evolved system capable of increasing the speed and reliability of a network while simultaneously extending a coverage region of a wireless network. For example, Institute of Electrical and Electronics Engineers (IEEE) 802.11n enables a data processing speed to support a maximum high throughput (HT) of 540 Mbps. In addition, Multiple Input and Multiple Output (MIMO) technology has recently been applied to both a transmitter and a receiver so as to minimize transmission errors as well as to optimize a data transfer rate.

DISCLOSURE

Technical Problem

Machine to Machine (M2M) communication technology has been discussed as next generation communication technology. A technical standard for supporting M2M communication in IEEE 802.11 WLAN has been developed as IEEE 802.11ah. M2M communication may consider a scenario capable of communicating a small amount of data infrequently at low speed in an environment including a large number of devices.

An object of the present invention is to provide a scheme for preventing resource waste and correctly performing frame switching by waiting for a response frame or deferring channel access in consideration of a response frame type and/or a channel bandwidth It is to be understood that technical objects to be achieved by the present invention are not limited to the aforementioned technical objects and other technical objects which are not mentioned herein will be apparent from the following description to one of ordinary skill in the art to which the present invention pertains.

Technical Solution

The object of the present invention can be achieved by providing a method for performing a response process in a wireless local access network (WLAN) system, including transmitting a frame requiring a response frame to a second station (STA) by a first STA; and waiting for the response frame during an ACKTimeout interval by the first STA. The ACKTimeout interval may be set to a different value according to a preamble channel bandwidth type of the frame. A preamble channel bandwidth of the response frame may be set to a value equal to the preamble channel bandwidth type of the frame.

In another aspect of the present invention, provided herein is a station (STA) for performing a response process in a wireless local access network (WLAN) system, including a transceiver and a processor. The processor may be configured to transmit a frame requiring a response frame to a second STA through the transceiver and wait for the response frame during an ACKTimeout interval. The ACKTimeout interval may be set to a different value according to a preamble channel bandwidth type of the frame. A preamble channel bandwidth of the response frame may be set to a value equal to the preamble channel bandwidth type of the frame.

According to the embodiments of the present invention, the followings may be commonly applied.

If the preamble channel bandwidth type of the frame is a preamble type of 1 MHz, the ACKTimeout interval may be calculated based on an aPHY-RX-START-Delay value for a preamble of 1 MHz. The aPHY-RX-START-Delay value may indicate a delay time until PHY-RXSTART.indication is issued. The PHY-RXSTART.indication may represent that a Physical Layer Convergence Procedure (PLCP) Packet Data Unit (PPDU) having a valid PLCP header starts to be received.

If the preamble channel bandwidth type of the frame is a preamble type of 2 MHz or more, the ACKTimeout interval may be calculated based on an aPHY-RX-START-Delay value for a preamble of 2 MHz or more. The aPHY-RX-START-Delay may indicate a delay time until PHY-RXSTART.indication is issued. The PHY-RXSTART.indication may represent that a Physical Layer Convergence Procedure (PLCP) Packet Data Unit (PPDU) having a valid PLCP header starts to be received.

If the frame has a preamble type of 2 MHz or more, the response frame may have a type other than a preamble type of 1 MHz.

If the frame has a preamble type of 2 MHz or more, the response frame may have a preamble type of 2 MHz.

If the frame has a preamble type of 1 MHz or more, the response frame may have a preamble type of 1 MHz.

If the response frame is received during the ACKTimeout interval, transmission of the frame may be determined to be successful.

If the response frame is not received during the ACKTimeout interval, transmission of the frame may be determined to be failure and a backoff procedure is performed by the first STA when the ACKTimeout interval is ended.

The frame may be one of a data frame, a Request To Send (RTS) frame, and a Power Save-Poll (PS-Poll) frame.

The response frame may be one of an Acknowledgement (ACK) frame, a Clear To Send (CTS) frame, and a data frame.

The STA may be an STA operating in a Sub-1 GHz (S1G) frequency band.

It is to be understood that both the foregoing general description and the following detailed description of the present invention are exemplary and explanatory and are intended to provide further explanation of the invention as claimed.

Advantageous Effects

According to the present invention, resource waste can be prevented and frame switching can be correctly performed by providing a method and apparatus for waiting for a response frame or deferring channel access in consideration of a response frame type and/or a channel bandwidth.

It will be appreciated by persons skilled in the art that the effects that can be achieved with the present invention are not limited to what has been particularly described hereinabove and other advantages of the present invention will be more clearly understood from the following detailed description taken in conjunction with the accompanying drawings.

DESCRIPTION OF DRAWINGS

The accompanying drawings, which are included to provide a further understanding of the invention, illustrate embodiments of the invention and together with the description serve to explain the principle of the invention.

BEST MODE

Figure 1:
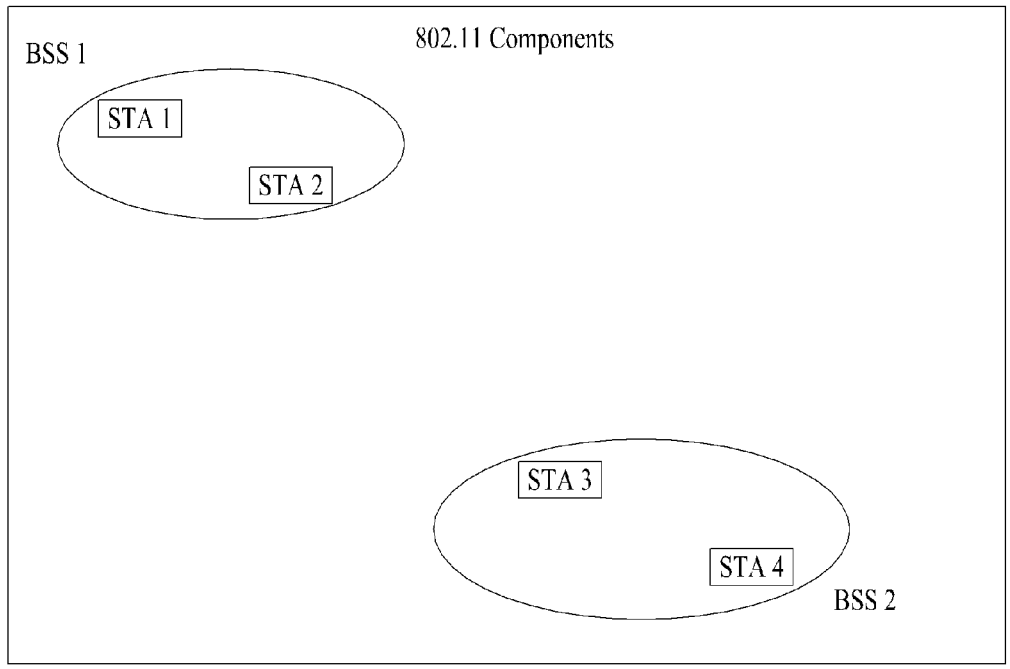
FIG. 1 exemplarily shows an IEEE 802.11 system according to one embodiment of the present invention.

Reference will now be made in detail to the preferred embodiments of the present invention, examples of which are illustrated in the accompanying drawings. The detailed description, which will be given below with reference to the accompanying drawings, is intended to explain exemplary embodiments of the present invention, rather than to show the only embodiments that can be implemented according to the present invention. The following detailed description includes specific details in order to provide a thorough understanding of the present invention. However, it will be apparent to those skilled in the art that the present invention may be practiced without such specific details.

The following embodiments are proposed by combining constituent components and characteristics of the present invention according to a predetermined format. The individual constituent components or characteristics should be considered optional factors on the condition that there is no additional remark. If required, the individual constituent components or characteristics may not be combined with other components or characteristics. In addition, some constituent components and/or characteristics may be combined to implement the embodiments of the present invention. The order of operations to be disclosed in the embodiments of the present invention may be changed. Some components or characteristics of any embodiment may also be included in other embodiments, or may be replaced with those of the other embodiments as necessary.

It should be noted that specific terms disclosed in the present invention are proposed for convenience of description and better understanding of the present invention, and the use of these specific terms may be changed to other formats within the technical scope or spirit of the present invention.

In some instances, well-known structures and devices are omitted in order to avoid obscuring the concepts of the present invention and important functions of the structures and devices are shown in block diagram form. The same reference numbers will be used throughout the drawings to refer to the same or like parts.

Exemplary embodiments of the present invention are supported by standard documents disclosed for at least one of wireless access systems including an Institute of Electrical and Electronics Engineers (IEEE) 802 system, a $3^{rd}$ Generation Partnership Project (3GPP) system, a 3GPP Long Term Evolution (LTE) system, an LTE-Advanced (LTE-A) system, and a 3GPP2 system. In particular, steps or parts, which are not described to clearly reveal the technical idea of the present invention, in the embodiments of the present invention may be supported by the above documents. All terminology used herein may be supported by at least one of the above-mentioned documents.

The following embodiments of the present invention can be applied to a variety of wireless access technologies, for example, CDMA (Code Division Multiple Access), FDMA (Frequency Division Multiple Access), TDMA (Time Division Multiple Access), OFDMA (Orthogonal Frequency Division Multiple Access), SC-FDMA (Single Carrier Frequency Division Multiple Access), and the like. CDMA may be embodied through wireless (or radio) technology such as UTRA (Universal Terrestrial Radio Access) or CDMA2000. TDMA may be embodied through wireless (or radio) technology such as GSM (Global System for Mobile communication)/GPRS (General Packet Radio Service)/EDGE (Enhanced Data Rates for GSM Evolution). OFDMA may be embodied through wireless (or radio) technology such as Institute of Electrical and Electronics Engineers (IEEE) 802.11 (Wi-Fi), IEEE 802.16 (WiMAX), IEEE 802-20, and E-UTRA (Evolved UTRA). For clarity, the following description focuses on IEEE 802.11 systems. However, technical features of the present invention are not limited thereto.

WLAN System Structure

FIG. 1 exemplarily shows an IEEE 802.11 system according to one embodiment of the present invention.

The structure of the IEEE 802.11 system may include a plurality of components. A WLAN which supports transparent STA mobility for a higher layer may be provided by mutual operations of the components. A Basic Service Set (BSS) may correspond to a basic constituent block in an IEEE 802.11 LAN. In FIG. 1, two BSSs (BSS1 and BSS2) are shown and two STAs are included in each of the BSSs (i.e. STA1 and STA2 are included in BSS1 and STA3 and STA4 are included in BSS2). An ellipse indicating the BSS in FIG. 1 may be understood as a coverage area in which STAs included in the corresponding BSS maintain communication. This area may be referred to as a Basic Service Area (BSA). If an STA moves out of the BSA, the STA cannot directly communicate with the other STAs in the corresponding BSA.

In the IEEE 802.11 LAN, the most basic type of BSS is an Independent BSS (IBSS). For example, the IBSS may have a minimum form consisting of only two STAs. The BSS (BSS1 or BSS2) of FIG. 1, which is the simplest form and in which other components are omitted, may correspond to a typical example of the IBSS. Such configuration is possible when STAs can directly communicate with each other. Such a type of LAN is not prescheduled and may be configured when the LAN is necessary. This may be referred to as an ad-hoc network.

Memberships of an STA in the BSS may be dynamically changed when the STA is switched on or off or the STA enters or leaves the BSS region. The STA may use a synchronization process to join the BSS. To access all services of a BSS infrastructure, the STA should be associated with the BSS. Such association may be dynamically configured and may include use of a Distribution System Service (DSS).

Figure 2:
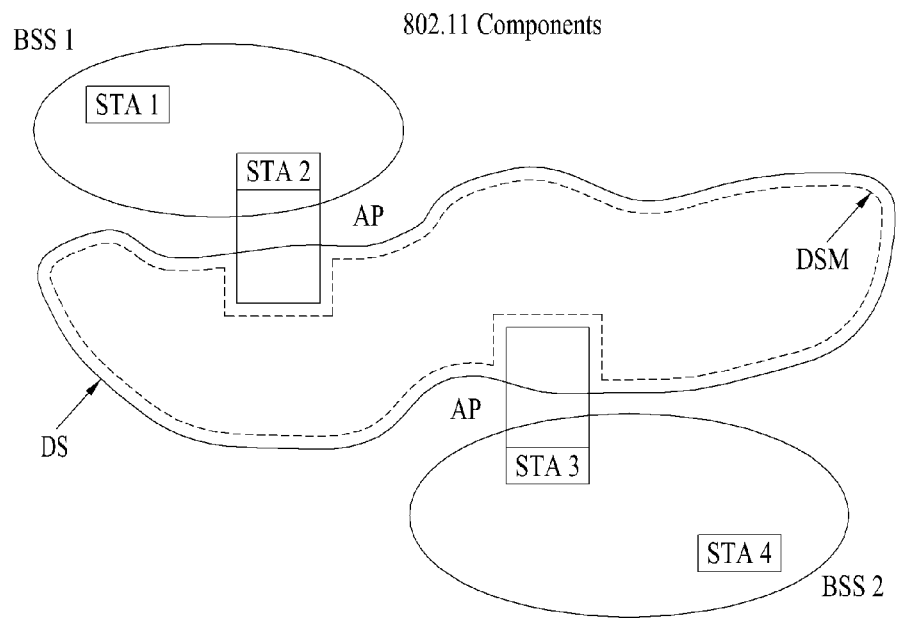
FIG. 2 exemplarily shows an IEEE 802.11 system according to another embodiment of the present invention.

FIG. 2 is a diagram showing another exemplary structure of an IEEE 802.11 system to which the present invention is applicable. In FIG. 2, components such as a Distribution System (DS), a Distribution System Medium (DSM), and an Access Point (AP) are added to the structure of FIG. 1.

A direct STA-to-STA distance in a LAN may be restricted by PHY performance. In some cases, such restriction of the distance may be sufficient for communication. However, in other cases, communication between STAs over a long distance may be necessary. The DS may be configured to support extended coverage.

The DS refers to a structure in which BSSs are connected to each other. Specifically, a BSS may be configured as a component of an extended form of a network consisting of a plurality of BSSs, instead of independent configuration as shown in FIG. 1.

The DS is a logical concept and may be specified by the characteristic of the DSM. In relation to this, a Wireless Medium (WM) and the DSM are logically distinguished in IEEE 802.11. Respective logical media are used for different purposes and are used by different components. In definition of IEEE 802.11, such media are not restricted to the same or different media. The flexibility of the IEEE 802.11 LAN architecture (DS architecture or other network architectures) can be explained in that a plurality of media is logically different. That is, the IEEE 802.11 LAN architecture can be variously implemented and may be independently specified by a physical characteristic of each implementation.

The DS may support mobile devices by providing seamless integration of multiple BSSs and providing logical services necessary for handling an address to a destination.

The AP refers to an entity that enables associated STAs to access the DS through a WM and that has STA functionality. Data may move between the BSS and the DS through the AP. For example, STA2 and STA3 shown in FIG. 2 have STA functionality and provide a function of causing associated STAs (STA1 and STA4) to access the DS. Moreover, since all APs correspond basically to STAs, all APs are addressable entities. An address used by an AP for communication on the WM need not always be identical to an address used by the AP for communication on the DSM.

Data transmitted from one of STAs associated with the AP to an STA address of the AP may always be received by an uncontrolled port and may be processed by an IEEE 802.1X port access entity. If the controlled port is authenticated, transmission data (or frame) may be transmitted to the DS.

Figure 3:
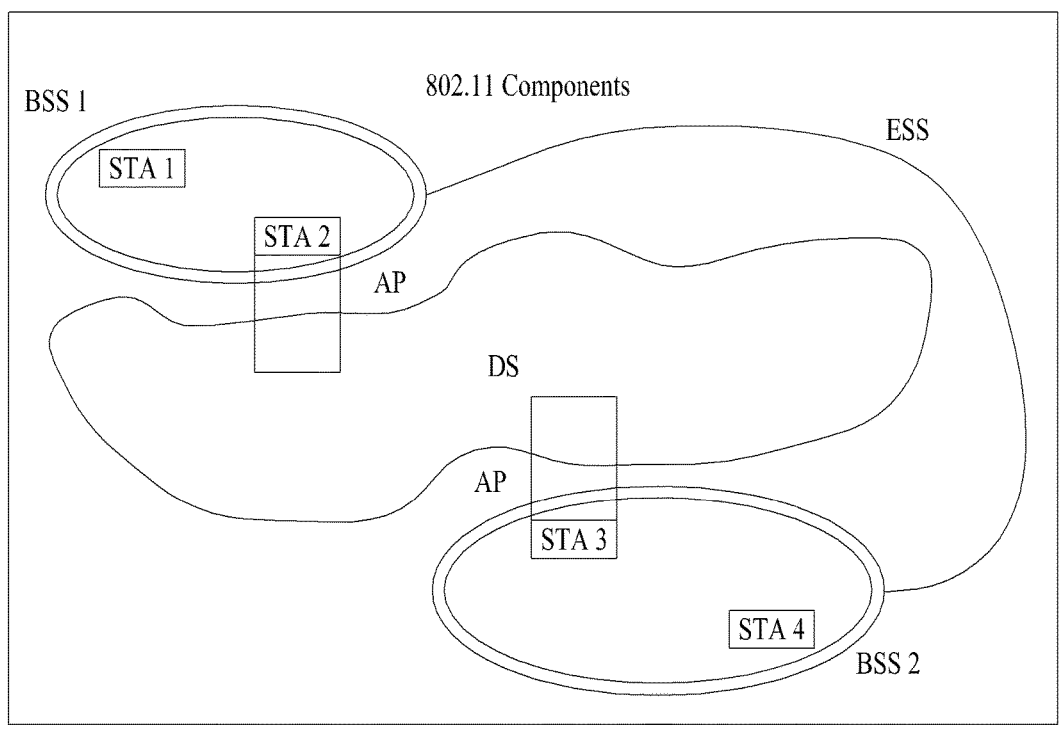
FIG. 3 exemplarily shows an IEEE 802.11 system according to still another embodiment of the present invention.

FIG. 3 is a diagram showing still another exemplary structure of an IEEE 802.11 system to which the present invention is applicable. In addition to the structure of FIG. 2, FIG. 3 conceptually shows an Extended Service Set (ESS) for providing wide coverage.

A wireless network having arbitrary size and complexity may be comprised of a DS and BSSs. In the IEEE 802.11 system, such a type of network is referred to an ESS network. The ESS may correspond to a set of BSSs connected to one DS. However, the ESS does not include the DS. The ESS network is characterized in that the ESS network appears as an IBSS network in a Logical Link Control (LLC) layer. STAs included in the ESS may communicate with each other and mobile STAs are movable transparently in LLC from one BSS to another BSS (within the same ESS).

In IEEE 802.11, relative physical locations of the BSSs in FIG. 3 are not assumed and the following forms are all possible. BSSs may partially overlap and this form is generally used to provide continuous coverage. BSSs may not be physically connected and the logical distances between BSSs have no limit. BSSs may be located at the same physical position and this form may be used to provide redundancy. One or more IBSSs or ESS networks may be physically located in the same space as one or more ESS networks. This may correspond to an ESS network form in the case in which an ad-hoc network operates in a location in which an ESS network is present, the case in which IEEE 802.11 networks of different organizations physically overlap, or the case in which two or more different access and security policies are necessary in the same location.

Figure 4:
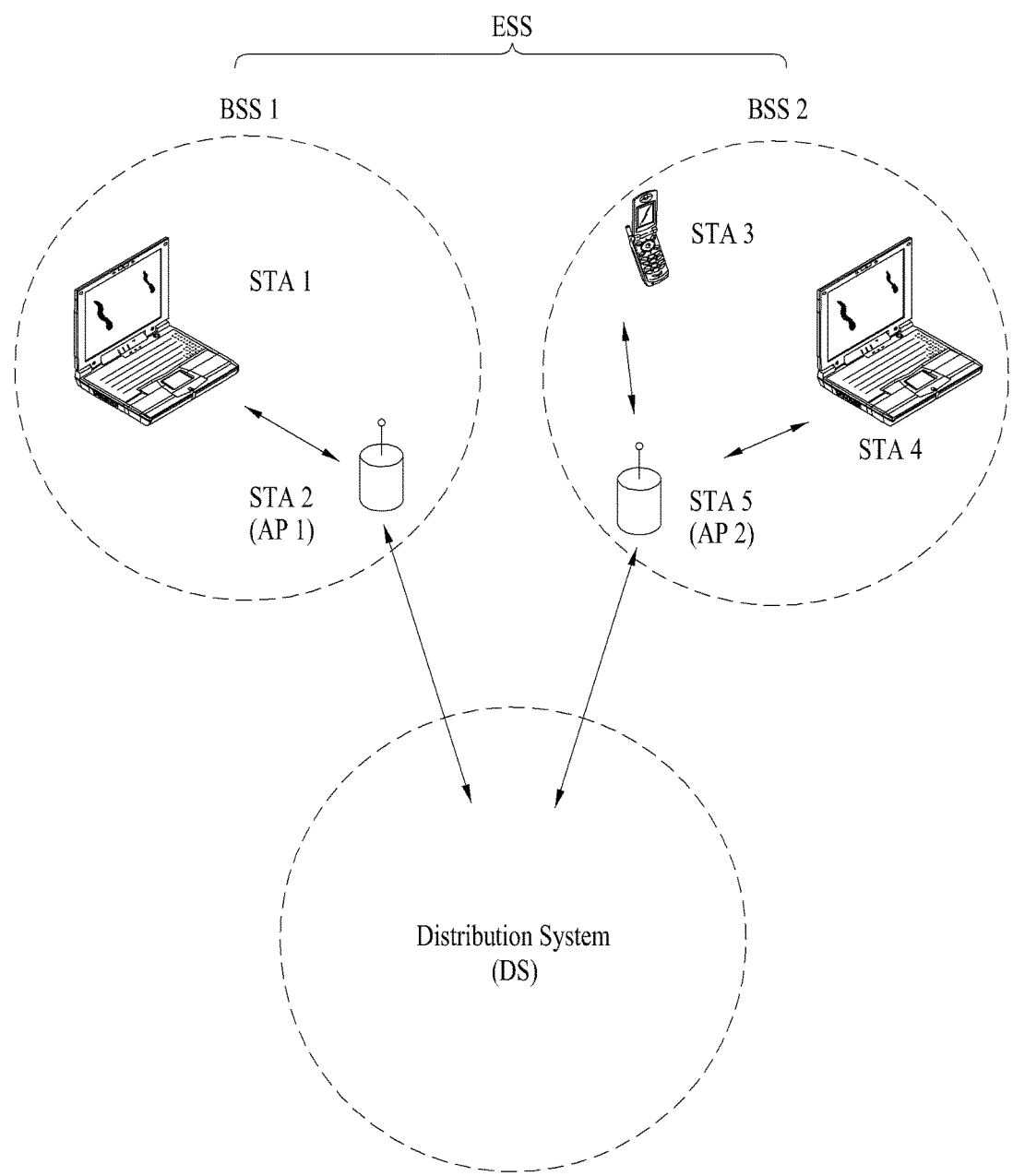
FIG. 4 is a conceptual diagram illustrating a WLAN system.

FIG. 4 is a diagram showing an exemplary structure of a WLAN system. In FIG. 4, an example of an infrastructure BSS including a DS is shown.

In the example of FIG. 4, BSS1 and BSS2 constitute an ESS. In the WLAN system, an STA is a device operating according to MAC/PHY regulation of IEEE 802.11. STAs include AP STAs and non-AP STAs. The non-AP STAs correspond to devices, such as laptop computers or mobile phones, handled directly by users. In FIG. 4, STA1, STA3, and STA4 correspond to the non-AP STAs and STA2 and STA5 correspond to AP STAs.

In the following description, the non-AP STA may be referred to as a terminal, a Wireless Transmit/Receive Unit (WTRU), a User Equipment (UE), a Mobile Station (MS), a mobile terminal, or a Mobile Subscriber Station (MSS). The AP is a concept corresponding to a Base Station (BS), a Node-B, an evolved Node-B (e-NB), a Base Transceiver System (BTS), or a femto BS in other wireless communication fields.

Layer Structure

In the WLAN system, an operation of an AP and/or STA in the present invention may be described from the perspective of a layer structure. The layer structure in terms of device configuration may be implemented by a processor. The AP or the STA may have a plurality of layer structures. For example, the 802.11 standard specifications mainly deal with a Medium Access Control (MAC) sublayer of a Data Link Layer (DLL) and a Physical (PHY) layer. The PHY layer may include a Physical Layer Convergence Protocol (PLCP) entity and a Physical Medium Dependent (PMD) entity. The MAC sublayer and the PHY layer conceptually include management entities, called a MAC Sublayer Management Entity (MLME) and a PHY Layer Management Entity (PLME), respectively. These entities provide layer management service interfaces through which layer management functions may be invoked.

In order to provide a correct MAC operation, a Station Management Entity (SME) is present within each of the AP and STA. The SME is a layer-independent entity that may be viewed as residing in a separate management plane or as residing off to the side. The exact functions of the SME are not described in detail but, in general, this entity may be viewed as being responsible for such functions as gathering of information about layer-dependent statuses from various Layer Management Entities (LMEs) and similarly setting the values of layer-specific parameters. The SME may typically perform such functions on behalf of general system management entities and may implement standard management protocols.

The foregoing entities interact in various ways. For example, the entities may interact with each other by exchanging GET/SET primitives. An XX-GET.request primitive is used to request the value of a given MIB attribute (management information-based attribute information). An XX-GET.confirm primitive returns an appropriate MIB attribute value if Status="success" and otherwise, returns an error indication in a status field. An XX-SET.request primitive is used to request that an indicated MIB attribute be set to a given value. If the MIB attribute implies a specific action, then this requests that the action be performed. An XX-SET.confirm primitive confirms that an indicated MIB attribute has been set to a requested value, if Status="success," and otherwise, the XX-SET.comfirm primitive returns an error condition in the status field. If the MIB attribute implies a specific action, then this confirms that the action has been performed.

The MLME and the SME may exchange various MLME_GET/SET primitives via an MLME_SAP (Service Access Point). In addition, various PLME_GET/SET primitives may be exchanged between the PLME and the SME via a PLME_SAP and between the MLME and the PLME via an MLME-PLME_SAP.

Link Setup Process

Figure 5:
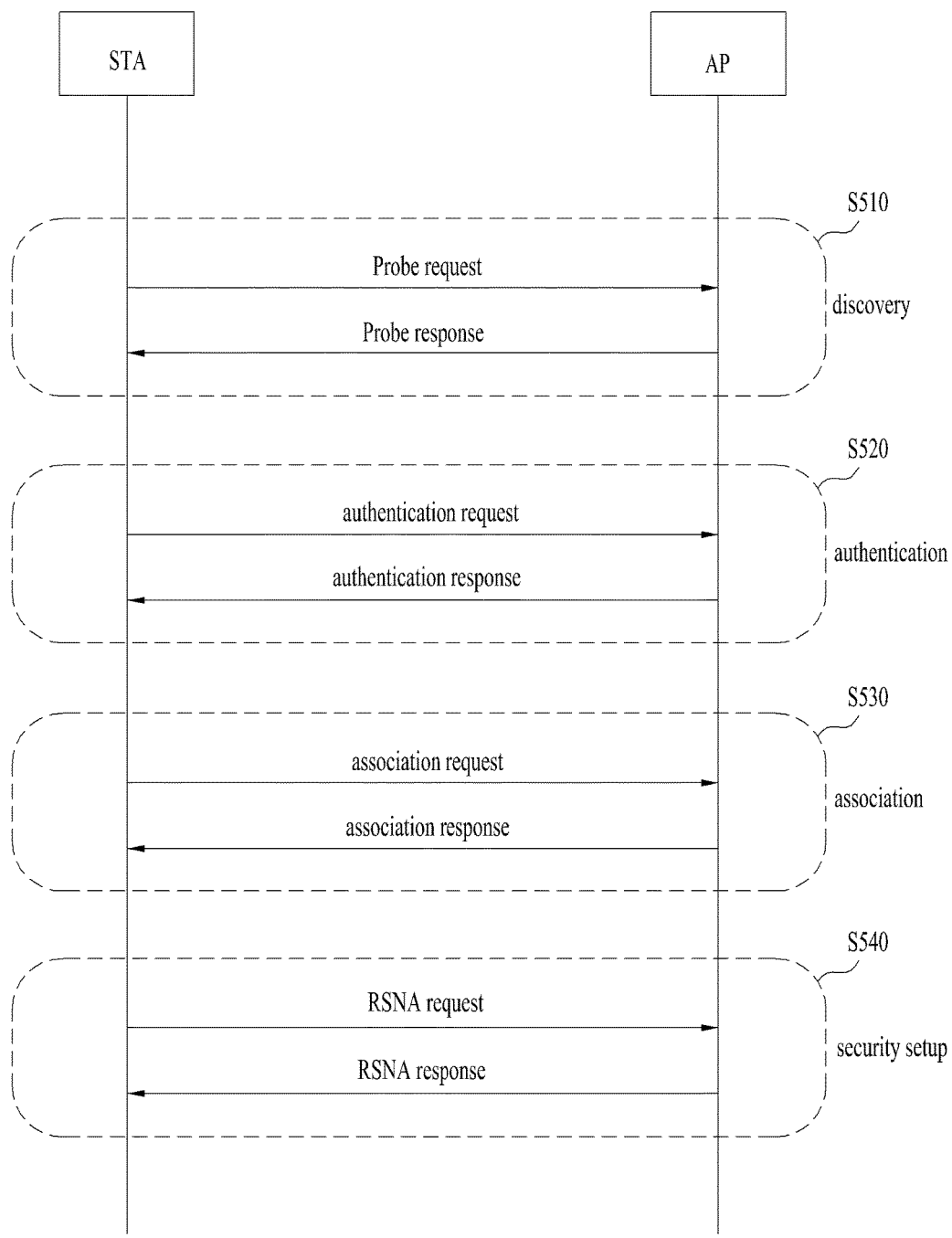
FIG. 5 is a flowchart illustrating a link setup process for use in the WLAN system.

FIG. 5 is a flowchart explaining a general link setup process according to an exemplary embodiment of the present invention.

In order to allow an STA to establish link setup on the network as well as to transmit/receive data over the network, the STA must perform such link setup through processes of network discovery, authentication, and association, and must establish association and perform security authentication. The link setup process may also be referred to as a session initiation process or a session setup process. In addition, an association step is a generic term for discovery, authentication, association, and security setup steps of the link setup process.

Link setup process is described referring to FIG. 5.

In step S510, STA may perform the network discovery action. The network discovery action may include the STA scanning action. That is, STA must search for an available network so as to access the network. The STA must identify a compatible network before participating in a wireless network. Here, the process for identifying the network contained in a specific region is referred to as a scanning process.

The scanning scheme is classified into active scanning and passive scanning.

FIG. 5 is a flowchart illustrating a network discovery action including an active scanning process. In the case of the active scanning, an STA configured to perform scanning transmits a probe request frame and waits for a response to the probe request frame, such that the STA can move between channels and at the same time can determine which AP (Access Point) is present in a peripheral region. A responder transmits a probe response frame, acting as a response to the probe request frame, to the STA having transmitted the probe request frame. In this case, the responder may be an STA that has finally transmitted a beacon frame in a BSS of the scanned channel. In BSS, since the AP transmits the beacon frame, the AP operates as a responder. In IBSS, since STAs of the IBSS sequentially transmit the beacon frame, the responder is not constant. For example, the STA, that has transmitted the probe request frame at Channel #1 and has received the probe response frame at Channel #1, stores BSS-associated information contained in the received probe response frame, and moves to the next channel (for example, Channel #2), such that the STA may perform scanning using the same method (i.e., probe request/response transmission/reception at Channel #2).

Although not shown in FIG. 5, the scanning action may also be carried out using passive scanning. An STA configured to perform scanning in the passive scanning mode waits for a beacon frame while simultaneously moving from one channel to another channel. The beacon frame is one of management frames in IEEE 802.11, indicates the presence of a wireless network, enables the STA performing scanning to search for the wireless network, and is periodically transmitted in a manner that the STA can participate in the wireless network. In BSS, the AP is configured to periodically transmit the beacon frame. In IBSS, STAs of the IBSS are configured to sequentially transmit the beacon frame. If each STA for scanning receives the beacon frame, the STA stores BSS information contained in the beacon frame, and moves to another channel and records beacon frame information at each channel. The STA having received the beacon frame stores BSS-associated information contained in the received beacon frame, moves to the next channel, and thus performs scanning using the same method.

In comparison between the active scanning and the passive scanning, the active scanning is more advantageous than the passive scanning in terms of delay and power consumption.

After the STA discovers the network, the STA may perform the authentication process in step S520. The authentication process may be referred to as a first authentication process in such a manner that the authentication process can be clearly distinguished from the security setup process of step S540.

The authentication process may include transmitting an authentication request frame to an AP by the STA, and transmitting an authentication response frame to the STA by the AP in response to the authentication request frame. The authentication frame used for authentication request/response may correspond to a management frame.

The authentication frame may include an authentication algorithm number, an authentication transaction sequence number, a state code, a challenge text, a Robust Security Network (RSN), a Finite Cyclic Group (FCG), etc. The above-mentioned information contained in the authentication frame may correspond to some parts of information capable of being contained in the authentication request/response frame, may be replaced with other information, or may include additional information.

The STA may transmit the authentication request frame to the AP. The AP may decide whether to authenticate the corresponding STA on the basis of information contained in the received authentication request frame. The AP may provide the authentication result to the STA through the authentication response frame.

After the STA has been successfully authenticated, the association process may be carried out in step S530. The association process may involve transmitting an association request frame to the AP by the STA, and transmitting an association response frame to the STA by the AP in response to the association request frame.

For example, the association request frame may include information associated with various capabilities, a beacon listen interval, a Service Set Identifier (SSID), supported rates, supported channels, RSN, mobility domain, supported operating classes, a TIM (Traffic Indication Map) broadcast request, interworking service capability, etc.

For example, the association response frame may include information associated with various capabilities, a state code, an Association ID (AID), supported rates, an Enhanced Distributed Channel Access (EDCA) parameter set, a Received Channel Power Indicator (RCPI), a Received Signal to Noise Indicator (RSNI), mobility domain, a timeout interval (association comeback time), an overlapping BSS scan parameter, a TIM broadcast response, a QoS map, etc.

The above-mentioned information may correspond to some parts of information capable of being contained in the association request/response frame, may be replaced with other information, or may include additional information.

After the STA has been successfully associated with the network, a security setup process may be carried out in step S540. The security setup process of Step S540 may be referred to as an authentication process based on Robust Security Network Association (RSNA) request/response. The authentication process of step S520 may be referred to as a first authentication process, and the security setup process of Step S540 may also be simply referred to as an authentication process.

For example, the security setup process of Step S540 may include a private key setup process through 4-way handshaking based on an (Extensible Authentication Protocol over LAN (EAPOL) frame. In addition, the security setup process may also be carried out according to other security schemes not defined in IEEE 802.11 standards.

WLAN Evolution

In order to obviate limitations in WLAN communication speed, IEEE 802.11n has recently been established as a communication standard. IEEE 802.11n aims to increase network speed and reliability as well as to extend a coverage region of the wireless network. In more detail, IEEE 802.11n supports a High Throughput (HT) of a maximum of 540 Mbps, and is based on MIMO technology in which multiple antennas are mounted to each of a transmitter and a receiver.

With the widespread use of WLAN technology and diversification of WLAN applications, there is a need to develop a new WLAN system capable of supporting a HT higher than a data processing speed supported by IEEE 802.11n. The next generation WLAN system for supporting Very High Throughput (VHT) is the next version (for example, IEEE 802.11ac) of the IEEE 802.11n WLAN system, and is one of IEEE 802.11 WLAN systems recently proposed to support a data process speed of 1 Gbps or more at a MAC SAP (Medium Access Control Service Access Point).

In order to efficiently utilize a radio frequency (RF) channel, the next generation WLAN system supports MU-MIMO (Multi User Multiple Input Multiple Output) transmission in which a plurality of STAs can simultaneously access a channel. In accordance with the MU-MIMO transmission scheme, the AP may simultaneously transmit packets to at least one MIMO-paired STA.

In addition, a technology for supporting WLAN system operations in whitespace has recently been discussed. For example, a technology for introducing the WLAN system in whitespace (TV WS) such as an idle frequency band (for example, 54~698 MHz band) left because of the transition to digital TV has been discussed under the IEEE 802.11af standard. However, the above-mentioned information is disclosed for illustrative purposes only, and the whitespace may be a licensed band capable of being primarily used only by a licensed user. The licensed user may be a user who has authority to use the licensed band, and may also be referred to as a licensed device, a primary user, an incumbent user, or the like.

For example, an AP and/or STA operating in the whitespace (WS) must provide a function for protecting the licensed user. For example, assuming that the licensed user such as a microphone has already used a specific WS channel acting as a divided frequency band on regulation in a manner that a specific bandwidth is occupied from the WS band, the AP and/or STA cannot use the frequency band corresponding to the corresponding WS channel so as to protect the licensed user. In addition, the AP and/or STA must stop using the corresponding frequency band under the condition that the licensed user uses a frequency band used for transmission and/or reception of a current frame.

Therefore, the AP and/or STA must determine whether to use a specific frequency band of the WS band. In other words, the AP and/or STA must determine the presence or absence of an incumbent user or a licensed user in the frequency band. The scheme for determining the presence or absence of the incumbent user in a specific frequency band is referred to as a spectrum sensing scheme. An energy detection scheme, a signature detection scheme and the like may be used as the spectrum sensing mechanism. The AP and/or STA may determine that the frequency band is being used by an incumbent user if the intensity of a received signal exceeds a predetermined value, or when a DTV preamble is detected.

M2M (Machine to Machine) communication technology has been discussed as next generation communication technology. Technical standard for supporting M2M communication has been developed as IEEE 802.11ah in the IEEE 802.11 WLAN system. M2M communication refers to a communication scheme including one or more machines, or may also be referred to as Machine Type Communication (MTC) or Machine To Machine (M2M) communication. In this case, the machine may be an entity that does not require direct handling and intervention of a user. For example, not only a meter or vending machine including a RF module, but also a user equipment (UE) (such as a smartphone) capable of performing communication by automatically accessing the network without user intervention/handling may be an example of such machines. M2M communication may include Device-to-Device (D2D) communication and communication between a device and an application server, etc. As exemplary communication between the device and the application server, communication between a vending machine and an application server, communication between the Point of Sale (POS) device and the application server, and communication between an electric meter, a gas meter or a water meter and the application server. M2M-based communication applications may include security, transportation, healthcare, etc. In the case of considering the above-mentioned application examples, M2M communication has to support the method for sometimes transmitting/receiving a small amount of data at low speed under an environment including a large number of devices.

In more detail, M2M communication must support a large number of STAs. Although the current WLAN system assumes that one AP is associated with a maximum of 2007 STAs, various methods for supporting other cases in which many more STAs (e.g., about 6000 STAs) are associated with one AP have recently been discussed in M2M communication. In addition, it is expected that many applications for supporting/requesting a low transfer rate are present in M2M communication. In order to smoothly support many STAs, the WLAN system may recognize the presence or absence of data to be transmitted to the STA on the basis of a TIM (Traffic Indication map), and various methods for reducing the bitmap size of the TIM have recently been discussed. In addition, it is expected that much traffic data having a very long transmission/reception interval is present in M2M communication. For example, in M2M communication, a very small amount of data (e.g., electric/gas/water metering) needs to be transmitted at long intervals (for example, every month). Therefore, although the number of STAs associated with one AP increases in the WLAN system, many developers and companies are conducting intensive research into an WLAN system which can efficiently support the case in which there are a very small number of STAs, each of which has a data frame to be received from the AP during one beacon period.

As described above, WLAN technology is rapidly developing, and not only the above-mentioned exemplary technologies but also other technologies such as a direct link setup, improvement of media streaming throughput, high-speed and/or support of large-scale initial session setup, and support of extended bandwidth and operation frequency, are being intensively developed.

Medium Access Mechanism

In the IEEE 802.11—based WLAN system, a basic access mechanism of MAC (Medium Access Control) is a Carrier Sense Multiple Access with Collision Avoidance (CSMA/CA) mechanism. The CSMA/CA mechanism is referred to as a Distributed Coordination Function (DCF) of IEEE 802.11 MAC, and basically includes a "Listen Before Talk" access mechanism. In accordance with the above-mentioned access mechanism, the AP and/or STA may perform Clear Channel Assessment (CCA) for sensing an RF channel or medium during a predetermined time interval (for example, DCF Inter-Frame Space (DIFS)), prior to data transmission. If it is determined that the medium is in the idle state, frame transmission through the corresponding medium begins. On the other hand, if it is determined that the medium is in the occupied state, the corresponding AP and/or STA does not start its own transmission, establishes a delay time (for example, a random backoff period) for medium access, and attempts to start frame transmission after waiting for a predetermined time. Through application of a random backoff period, it is expected that multiple STAs will attempt to start frame transmission after waiting for different times, resulting in minimum collision.

In addition, IEEE 802.11 MAC protocol provides a Hybrid Coordination Function (HCF). HCF is based on DCF and Point Coordination Function (PCF). PCF refers to the polling-based synchronous access scheme in which periodic polling is executed in a manner that all reception (Rx) APs and/or STAs can receive the data frame. In addition, HCF includes Enhanced Distributed Channel Access (EDCA) and HCF Controlled Channel Access (HCCA). EDCA is achieved when the access scheme provided from a provider to a plurality of users is contention-based. HCCA is achieved by the contention-free-based channel access scheme based on the polling mechanism. In addition, HCF includes a medium access mechanism for improving Quality of Service (QoS) of WLAN, and may transmit QoS data in both a Contention Period (CP) and a Contention Free Period (CFP).

Figure 6:
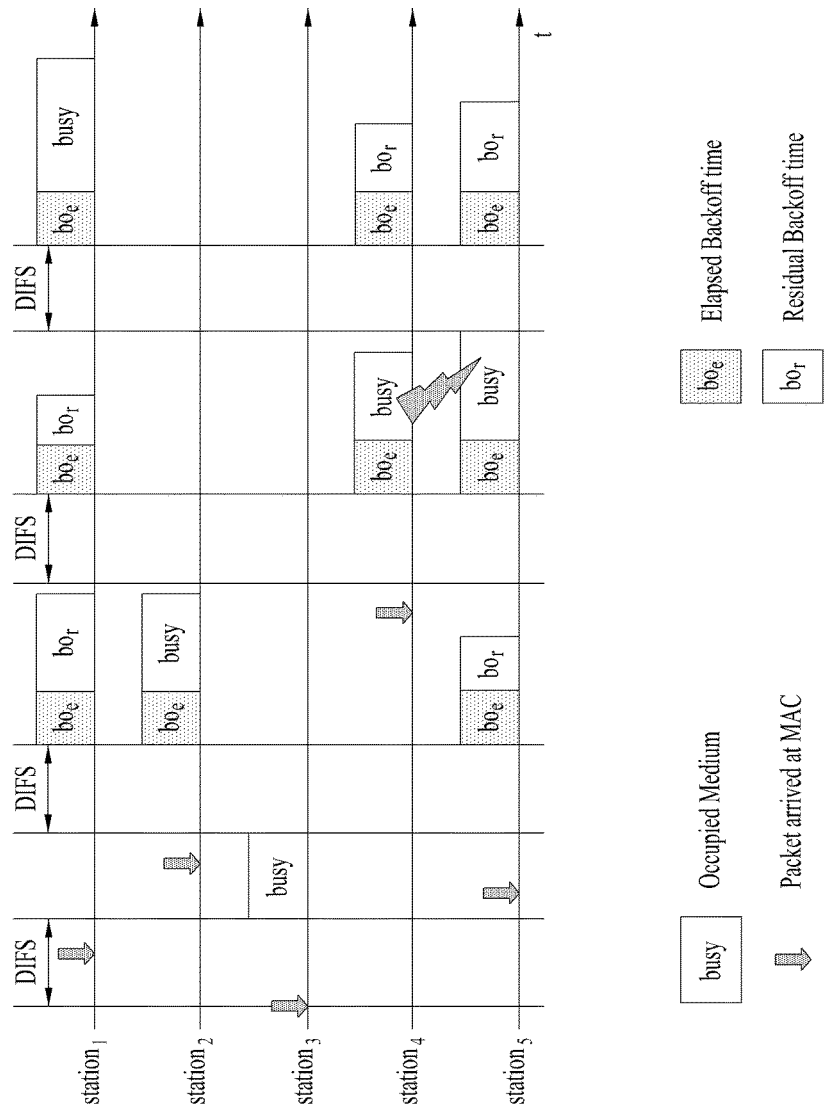
FIG. 6 is a conceptual diagram illustrating a backoff procedure.

FIG. 6 is a conceptual diagram illustrating a backoff procedure.

Operations based on a random backoff period will hereinafter be described with reference to FIG. 6. If the occupy- or busy-state medium is shifted to an idle state, several STAs may attempt to transmit data (or frame). As a method for implementing a minimum number of collisions, each STA selects a random backoff count, waits for a slot time corresponding to the selected backoff count, and then attempts to start data transmission. The random backoff count is a pseudo-random integer, and may be set to one of 0 to CW values. In this case, CW refers to a Contention Window parameter value. Although an initial value of the CW parameter is denoted by CWmin, the initial value may be doubled in case of a transmission failure (for example, in the case in which ACK of the transmission frame is not received). If the CW parameter value is denoted by CWmax, CWmax is maintained until data transmission is successful, and at the same time it is possible to attempt to start data transmission. If data transmission was successful, the CW parameter value is reset to CWmin. Preferably, CW, CWmin, and CWmax are set to $2^n-1$ (where n=0, 1, 2, . . . ).

If the random backoff procedure starts operation, the STA continuously monitors the medium while counting down the backoff slot in response to the decided backoff count value. If the medium is monitored as the occupied state, the countdown stops and waits for a predetermined time. If the medium is in the idle state, the remaining countdown restarts.

As shown in the example of FIG. 6, if a packet to be transmitted to MAC of STA3 arrives at the STA3, the STA3 determines whether the medium is in the idle state during the DIFS, and may directly start frame transmission. In the meantime, the remaining STAs monitor whether the medium is in the busy state, and wait for a predetermined time. During the predetermined time, data to be transmitted may occur in each of STA1, STA2, and STA5. If the medium is in the idle state, each STA waits for the DIFS time and then performs countdown of the backoff slot in response to a random backoff count value selected by each STA. The example of FIG. 6 shows that STA2 selects the lowest backoff count value and STA1 selects the highest backoff count value. That is, after STA2 finishes backoff counting, the residual backoff time of STA5 at a frame transmission start time is shorter than the residual backoff time of STA1. Each of STA1 and STA5 temporarily stops countdown while STA2 occupies the medium, and waits for a predetermined time. If occupying of the STA2 is finished and the medium re-enters the idle state, each of STA1 and STA5 waits for a predetermined time DIFS, and restarts backoff counting. That is, after the remaining backoff slot as long as the residual backoff time is counted down, frame transmission may start operation. Since the residual backoff time of STA5 is shorter than that of STA1, STA5 starts frame transmission. Meanwhile, data to be transmitted may occur in STA4 while STA2 occupies the medium. In this case, if the medium is in the idle state, STA4 waits for the DIFS time, performs countdown in response to the random backoff count value selected by the STA4, and then starts frame transmission. FIG. 6 exemplarily shows the case in which the residual backoff time of STA5 is identical to the random backoff count value of STA4 by chance. In this case, an unexpected collision may occur between STA4 and STA5. If the collision occurs between STA4 and STA5, each of STA4 and STA5 does not receive ACK, resulting in the occurrence of a failure in data transmission. In this case, each of STA4 and STA5 increases the CW value two times, and STA4 or STA5 may select a random backoff count value and then perform countdown. Meanwhile, STA1 waits for a predetermined time while the medium is in the occupied state due to transmission of STA4 and STA5. In this case, if the medium is in the idle state, STA1 waits for the DIFS time, and then starts frame transmission after lapse of the residual backoff time.

STA Sensing Operation

As described above, the CSMA/CA mechanism includes not only a physical carrier sensing mechanism in which the AP and/or STA can directly sense the medium, but also a virtual carrier sensing mechanism. The virtual carrier sensing mechanism can solve some problems (such as a hidden node problem) encountered in the medium access. For the virtual carrier sensing, MAC of the WLAN system can utilize a Network Allocation Vector (NAV). In more detail, by means of the NAV value, the AP and/or STA, each of which currently uses the medium or has authority to use the medium, may inform another AP and/or another STA for the remaining time in which the medium is available. Accordingly, the NAV value may correspond to a reserved time in which the medium will be used by the AP and/or STA configured to transmit the corresponding frame. An STA having received the NAV value may prohibit medium access (or channel access) during the corresponding reserved time. For example, NAV may be set according to the value of a 'duration' field of the MAC header of the frame.

The robust collision detect mechanism has been proposed to reduce the probability of such collision, and as such a detailed description thereof will hereinafter be described with reference to FIGS. 7 and 8. Although an actual carrier sensing range is different from a transmission range, it is assumed that the actual carrier sensing range is identical to the transmission range for convenience of description and better understanding of the present invention.

Figure 7:
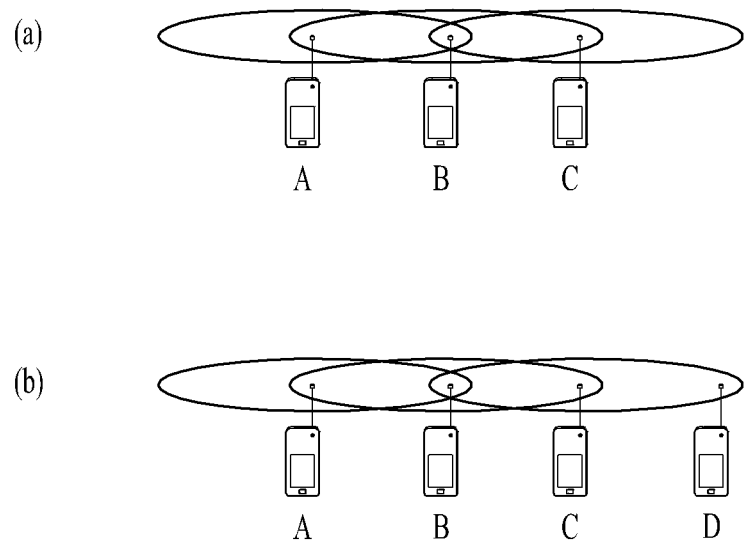
FIG. 7 is a conceptual diagram illustrating a hidden node and an exposed node.

FIG. 7 is a conceptual diagram illustrating a hidden node and an exposed node.

FIG. 7(a) exemplarily shows the hidden node. In FIG. 7(a), STA A communicates with STA B, and STA C has information to be transmitted. In FIG. 7(a), STA C may determine that the medium is in the idle state when performing carrier sensing before transmitting data to STA B, under the condition that STA A transmits information to STA B. Since transmission of STA A (i.e., occupied medium) may not be detected at the location of STA C, it is determined that the medium is in the idle state. In this case, STA B simultaneously receives information of STA A and information of STA C, resulting in the occurrence of collision. Here, STA A may be considered as a hidden node of STA C.

FIG. 7(b) exemplarily shows an exposed node. In FIG. 7(b), under the condition that STA B transmits data to STA A, STA C has information to be transmitted to STA D. If STA C performs carrier sensing, it is determined that the medium is occupied due to transmission of STA B. Therefore, although STA C has information to be transmitted to STA D, the medium-occupied state is sensed, such that the STA C must wait for a predetermined time (i.e., standby mode) until the medium is in the idle state. However, since STA A is actually located out of the transmission range of STA C, transmission from STA C may not collide with transmission from STA B from the viewpoint of STA A, such that STA C unnecessarily enters the standby mode until STA B stops transmission. Here, STA C is referred to as an exposed node of STA B.

Figure 8:
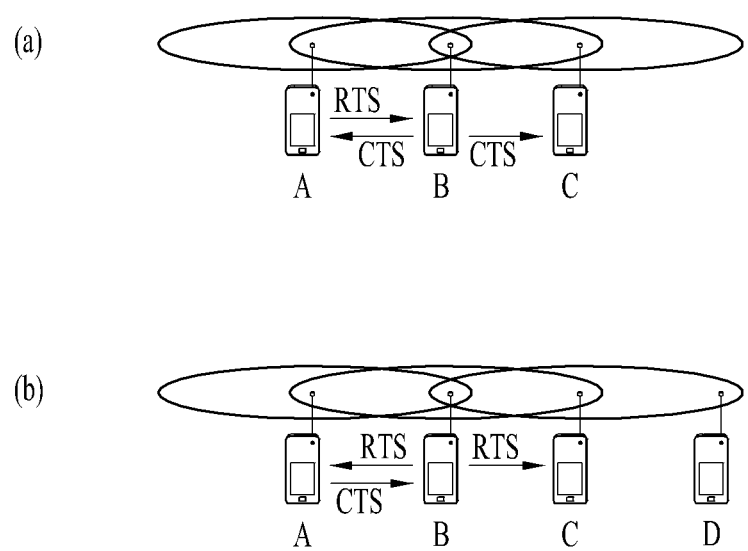
FIG. 8 is a conceptual diagram illustrating RTS (Request To Send) and CTS (Clear To Send).

FIG. 8 is a conceptual diagram illustrating RTS (Request To Send) and CTS (Clear To Send).

In order to efficiently utilize the collision avoidance mechanism under the above-mentioned situation of FIG. 7, it is possible to use a short signaling packet such as RTS (request to send) and CTS (clear to send). RTS/CTS between two STAs may be overheard by peripheral STA(s), such that the peripheral STA(s) may consider whether information is communicated between the two STAs. For example, if STA to be used for data transmission transmits the RTS frame to the STA having received data, the STA having received data transmits the CTS frame to peripheral STAs, and may inform the peripheral STAs that the STA is going to receive data.

FIG. 8(a) exemplarily shows the method for solving problems of the hidden node. In FIG. 8(a), it is assumed that each of STA A and STA C is ready to transmit data to STA B. If STA A transmits RTS to STA B, STA B transmits CTS to each of STA A and STA C located in the vicinity of the STA B. As a result, STA C must wait for a predetermined time until STA A and STA B stop data transmission, such that collision is prevented from occurring.

FIG. 8(b) exemplarily shows the method for solving problems of the exposed node. STA C performs overhearing of RTS/CTS transmission between STA A and STA B, such that STA C may determine no collision although it transmits data to another STA (for example, STA D). That is, STA B transmits an RTS to all peripheral STAs, and only STA A having data to be actually transmitted can transmit a CTS. STA C receives only the RTS and does not receive the CTS of STA A, such that it can be recognized that STA A is located outside of the carrier sensing range of STA C.

Frame Structure

Figure 9:
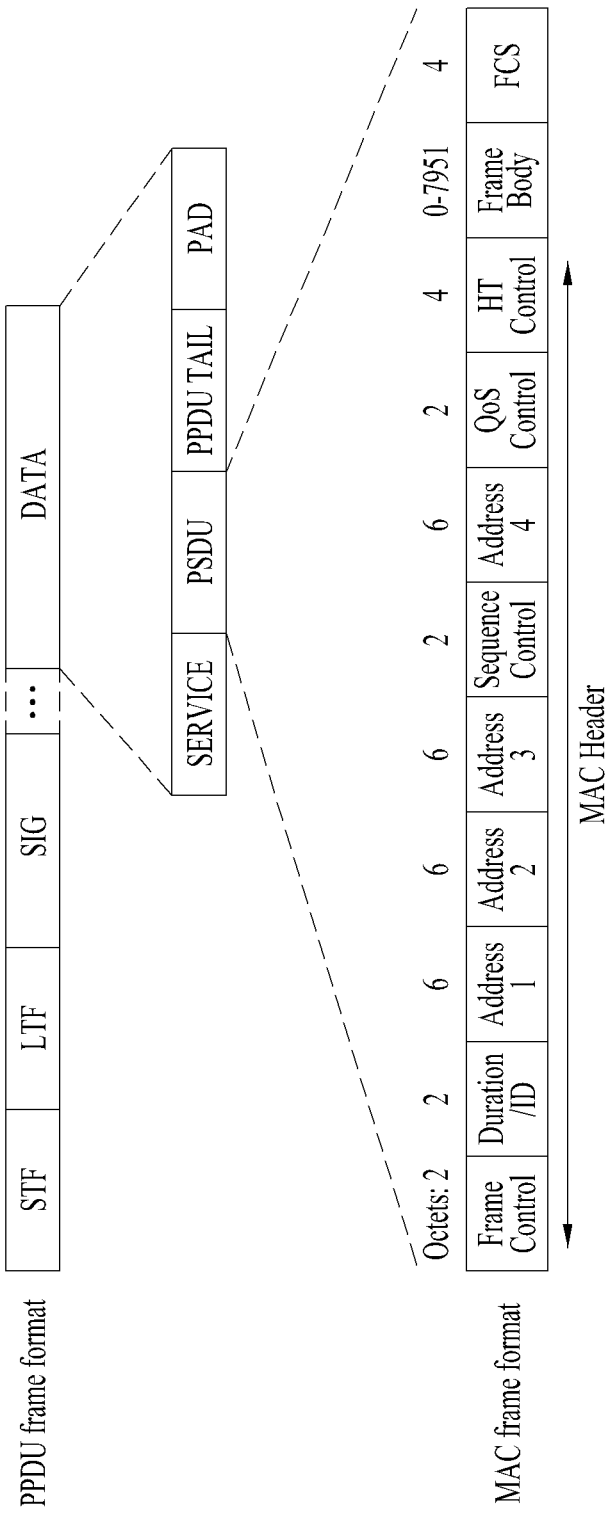
FIG. 9 is a diagram for explaining an exemplary frame structure used in an IEEE 802.11 system.

FIG. 9 is a diagram for explaining an exemplary frame structure used in an IEEE 802.11 system.

A Physical Layer Convergence Protocol (PLCP) Packet Data Unit (PPDU) frame format may include a Short Training Field (STF), a Long Training Field (LTF), a Signal (SIG) field, and a data (DATA) field. The most fundamental (e.g. non-High Throughput (HT)) PPDU frame format may include only a Legacy-STF (L-STF), a Legacy-LTF (L-LTF), a SIG field, and a DATA field. Additional (or another type of) STF, LTF, and SIG field may be included between the SIG field and the DATA field according to a PPDU frame format type (e.g. HT-mixed format PPDU, HT-greenfield format PPDU, Very High Throughput (VHT) PPDU, etc.).

The STF is a field for signals for signal detection, Automatic Gain Control (AGC), diversity selection, accurate time synchronization, etc. The LTF is a field for signals for channel estimation, frequency error estimation, etc. Both the STF and the LTF may be referred to as a PCLP preamble. The PLCP preamble may be a signal for synchronization of an OFDM physical layer and channel estimation.

The SIG field may include a Rate field and a Length field. The Rate field may include information about data modulation and coding rate. The Length field may include information about the length of data. Additionally, the SIG field may include a parity bit, a SIG tail bit, etc.

The DATA field may include a Service field, a PLCP Service Data Unit (PSDU), and a PPDU tail bit and may further include a padding (PAD) bit when necessary. Some bits of the Service field may be used for synchronization of a descrambler in a receiver. The PSDU may correspond to a MAC Packet Data Unit (PDU) defined in a MAC layer and include data generated/used in a higher layer. The PPDU tail bit may be used to return an encoder to the state of 0. The PAD bit may be used to adjust the length of the data field to a predetermined unit.

A MAC header includes a Frame Control field, a Duration/ID field, an Address field, etc. The Frame Control field may include control information necessary for frame transmission/reception. The Duration/ID field may be set to a time for transmitting a corresponding frame. For a detailed description of Sequence Control, QoS Control, and HT Control subfields of the MAC header, refer to the IEEE 802.11-1012 standard specification.

The Frame Control field of the MAC header may include Protocol Version Type, Subtype, To DS, From DS, More Fragment, Retry, Power Management, More Data, and Protected Frame Order subfields. For a description of the Frame Control Field and subfields of the Frame Control field, refer to the IEEE 802.11-1012 standard specification.

Meanwhile, a Null-Data Packet (NDP) frame format refers to a frame format which does not include a data packet. That is, the NDP frame includes only a PLCP header (i.e. an STF, an LTF, and a SIG field) in a normal PPDU format and does not include the other part (i.e. a data field). The NDP frame may also be referred to as a short frame format.

S1G Frame Format

In order to support applications such as M2M, Internet of Things (IoT), smart grid, etc., long-range, low-power communication is required. To this end, a communication protocol using a channel bandwidth of 1 MHz/2 MHz/4 MHz/8 MHz/16 MHz in a frequency band of 1 GHz or below (Sub 1 GHz: S1G) (e.g. 902 to 928 MHz) is under discussion.

Three types of formats are defined for an S1G PPDU: a short format used in a bandwidth of S1G greater than or equal to 2 MHz, a long format used in a bandwidth of S1G greater than or equal to 2 MHz, and a format used in a bandwidth of S1G 1 MHz.

Figure 10:
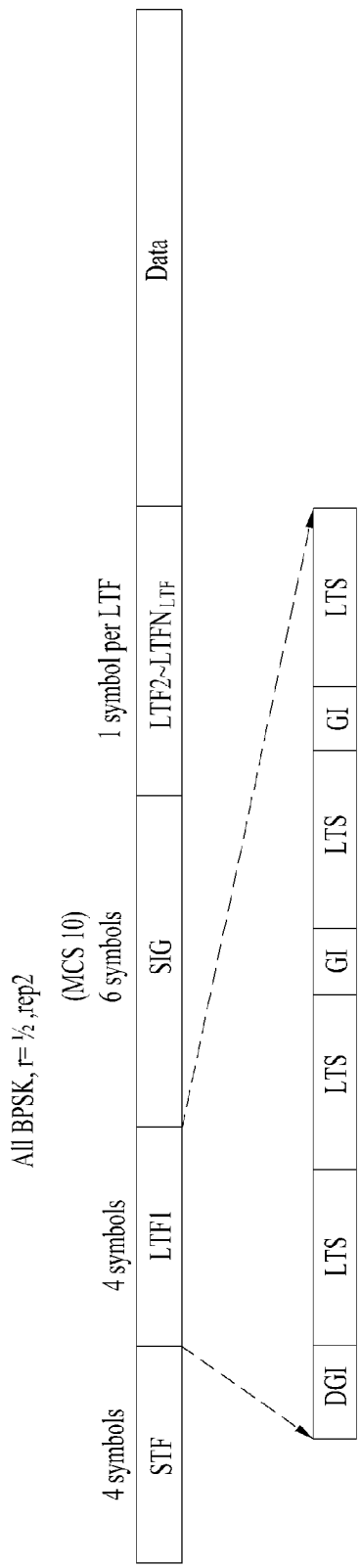
FIG. 10 is a diagram illustrating an exemplary S1G 1 MHz format.

FIG. 10 is a diagram illustrating an exemplary S1G 1 MHz format.

The S1G 1 MHz format may be used for 1 MHz PPDU Single User (SU) transmission.

Like a Green-field format defined by IEEE 802.11n, the S1G 1 MHz format illustrated in FIG. 10 includes STF, LTF1, SIG, LTF2-LTFN$_{LTF}$, and Data fields. However, the transmission time of a preamble part of the S1G 1 MHz format is increased by two or more times through repetition, compared to the Green-field format.

Although the STF field of FIG. 10 has the same periodicity as an STF (a 2-symbol length) of a PPDU in a bandwidth of 2 MHz or above, the STF field is twice repeated (rep2) in time and thus has a 4-symbol length (e.g. 160 μs). 3-dB power boosting may be applied.

The LTF1 field of FIG. 10 is designed to be orthogonal to the LTF1 field (having a 2-symbol length) of the PPDU in the bandwidth of 2 MHz or above in the frequency domain and may be repeated twice in time to have a 4-symbol length. The LTF1 field may include Double Guard Interval (DGI), Long Training Sequence (LTS), LTS, Guard Interval (GI), LTS, GI, and LTS subfields.

Figure 15:
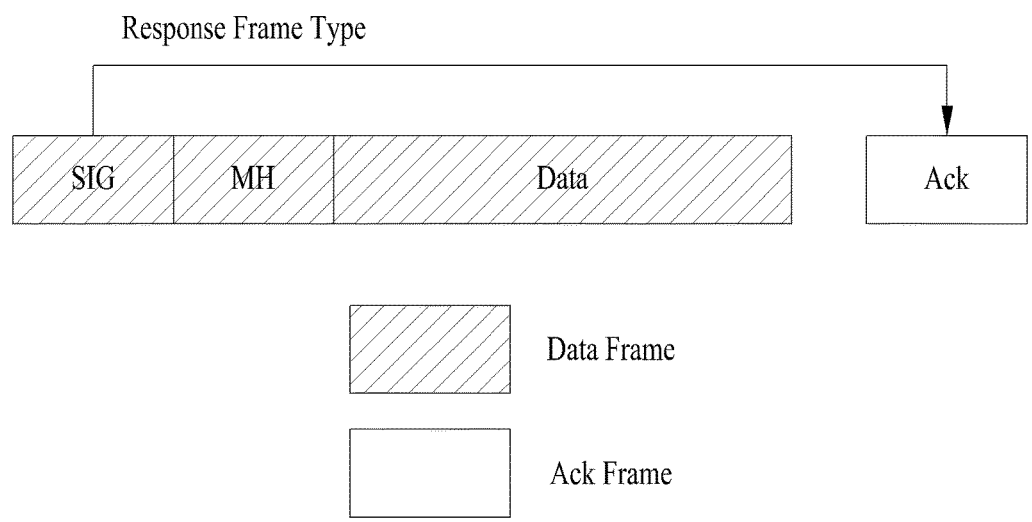
FIG. 15 is a diagram for explaining an example of the present invention using a response frame type field of an SIG field of a PLCP header.

The SIG field of FIG. 15 may be repeatedly encoded. The lowest Modulation and Coding Scheme (MCS) (i.e. Binary Phase Shift Keying (BPSK)) and repetition coding (rep2) may be applied to the SIG field. The SIG field may be configured to have a rate of 1/2 and defined as a length of 6 symbols.

The LTF2 to LTFN$_{LTF}$ fields of FIG. 10 may be included in the case of MIMO. Each LTF field may be one symbol long.

In the 1 MHz PPDU preamble format of FIG. 10, the STF, LTF1, SIG, and LTF2-LTFN$_{LTF}$ fields correspond to an omni portion transmitted in every direction and are transmitted without beamforming so that all STAs may receive the fields.

Figure 11:
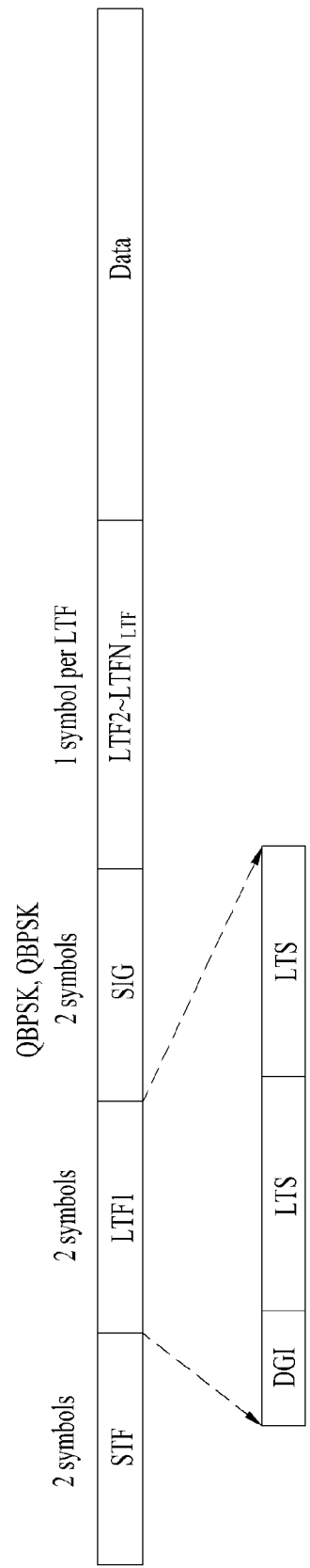
FIG. 11 is a diagram illustrating an exemplary short format of SIG greater than or equal to 2 MHz.

FIG. 11 illustrates an exemplary short format of SIG greater than or equal to 2 MHz.

The short format of SIG greater than or equal to 2 MHz may be used for SU transmission in a PPDU of 2 MHz, 4 MHz, 8 MHz, or 16 MHz.

The STF field of FIG. 11 may have a length of 2 symbols.

An LTF1 field of FIG. 11 may have a length of 2 symbols and include DGI, LTS, and LTS.

An SIG field of FIG. 11 may be subjected to Quadrature PSK (QPSK), BPSK, etc. as an MCS.

Each of LTF2 to LTFN$_{LTF}$ fields of FIG. 11 may have a length of one symbol.

Figure 12:
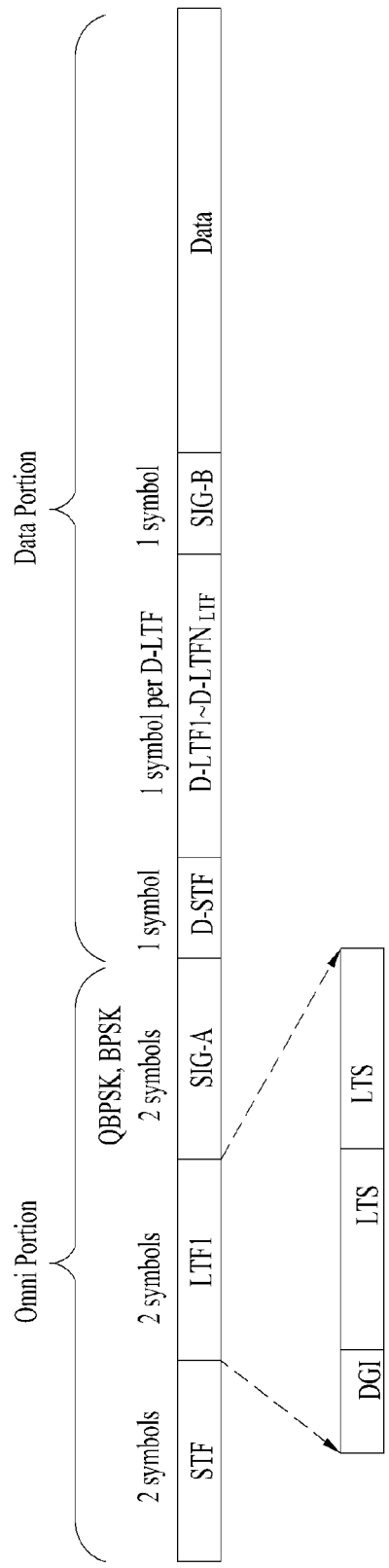
FIG. 12 is a diagram illustrating an exemplary long format of S1G greater than or equal to 2 MHz.

FIG. 12 illustrates an exemplary long format of S1G greater than or equal to 2 MHz.

The long format of S1G greater than or equal to 2 MHz may be used for MU transmission and SU beamformed transmission in a PPDU of 2 MHz, 4 MHz, 8 MHz, or 16 MHz. The long format of SIG greater than or equal to 2 MHz may include an omni portion transmitted in omnidirections so that all STAs may receive the format and a data portion subjected to beamforming so that specific STAs may receive the format.

In the long format of SIG greater than or equal to 2 MHz, the omni portion may include STF, LTF1, and Signal-A (SIG A) fields.

The STF field of FIG. 12 may have a length of 2 symbols.

The LTF1 field of FIG. 12 may have a length of 2 symbols and include DGI, LTS, and LTS.

The SIG-A field of FIG. 12 may be subjected to QPSK, BPSK, etc. as an MCS and have a length of 2 symbols.

In the long format of SIG greater than or equal to 2 MHz, the data portion may include Short Training Field for Data (D-STF), Long Training Field for Data (STF-L), Signal-B (SIG-B), and Data fields. The data portion in the PPDU format of FIG. 12 may be referred to as an MU portion. In this sense, D-STF may be referred to as MU-STF and D-LTF may be referred to as MU-LTF.

The D-STF field of FIG. 12 may have a length of one symbol.

Each subfield of the D-LTF field of FIG. 12, i.e. each of D-LTF1 to D-LTFN$_{LTF}$ may have a length of one symbol.

The SIG-B field of FIG. 12 may have a length of one symbol.

Each field of the preamble format of the PPDU of SIG greater than or equal to 2 MHz as described above will now be described in more detail.

In the omni portion, the STF, LTF1, SIG-A fields may be transmitted as a single stream with respect to the respective subcarriers. This may be indicated as follows.

$$[x_k]_{N_{Tx} \times 1} = [Q_k]_{N_{Tx} \times 1} d_k \qquad \text{[Equation 1]}$$

In Equation 1, k denotes a subcarrier (or tone) index, $x_k$ denotes a signal transmitted in subcarrier k, and $N_{TX}$ denotes the number of transmit antennas. $Q_k$ denotes a column vector for encoding (e.g. spatial-mapping) a signal transmitted in subcarrier k and $d_k$ indicates data input to an encoder. In Equation 1, a Cyclic Shift Delay (CSD) in the time domain may be applied to $Q_k$. The CSD in the time domain indicates phase rotation or phase shift in the frequency domain. Accordingly, $Q_k$ may include a phase shift value in tone k generated by the CSD in the time domain.

When the frame format as illustrated in FIG. 12 is used, the STF, LTF1, SIG-A fields may be received by all STAs and each of the STAs may decode the SIG-A field through channel estimation based on the STF and LTF1 fields.

The SIG-A field may include information about length/duration, channel bandwidth, number of spatial streams, etc. The S1G-A field has a length of two OFDM symbols. One OFDM symbol uses BPSK modulation with respect to 48 data tones and therefore 24 bits of information may be carried on one OFDM symbol. Then, the SIG-A field may include 48-bit information.

The following Table 1 shows exemplary bit assignment of the SIG-A field for each of an SU frame and an MU frame.

TABLE 1

|  | SU | MU |
| --- | --- | --- |
| SU/MU Indication | 1 | 1 |
| Length/Duration | 9 | 9 |
| MCS | 4 |  |
| BW | 2 | 2 |
| Aggregation | 1 |  |
| STBC | 1 | 1 |
| Coding | 2 | 5 |
| SGI | 1 | 1 |
| GID |  | 6 |
| Nsts | 2 | 8 |
| PAID | 9 |  |
| ACK Indication | 2 | 2 |
| Reserved | 3 | 3 |
| CRC | 4 | 4 |
| Tail | 6 | 6 |
| Total | 48 | 48 |

In Table 1, the SU/MU Indication field is used to distinguish between an SU frame format and an MU frame format.

The Length/Duration field indicates the number of OFDM symbols (i.e. duration) or the number of bytes (i.e. length) of a frame. In the SU frame, when the value of the Aggregation field is 1, the Length/Duration field is interpreted as the Duration field. Meanwhile, when the value of the Aggregation field is 0, the Length/Duration field is interpreted as the Length field. In the MU frame, since the Aggregation field is not defined and the MU frame is configured to always apply aggregation, the Length/Duration field is interpreted as the Duration field.

The MCS field indicates an MCS used for PSDU transmission. The MCS field is transmitted through the SIG-A field only in the SU frame. If other STAs (i.e. third party STAs (also called third STAs) that are not directly associated with transmission/reception between two STAs) receive the SU frame, the duration of a currently received SU frame (i.e. an SU beamformed frame in which the Aggregation field is set to 0) may be calculated based on the length value of the Length/Duration field and the value of the MCS field. Meanwhile, the MCS field of the MU frame is included not in the SIG-A field but in an SIG-B field carrying user-specific information and an MCS may be independently applied to each user.

The BW field indicates the channel bandwidth of a transmitted SU frame or MU frame. For example, the BW field may be set to a value indicating one of 2 MHz, 4 MHz, 8 MHz, 16 MHz, and 8+8 MHz.

The Aggregation field indicates whether PSDUs are aggregated in the form of an Aggregation MAC PDU (i.e. an A-MPDU). If the Aggregation field is set to 1, this indicates that the PSDUs are aggregated in the form of the A-MPDU and transmitted. If the Aggregation field is set to 0, this represents that the PSDUs are transmitted without being aggregated. In the MU frame, since the PSDUs are always transmitted in the form of the A-MPDU, the Aggregation field does not need to be signaled and therefore the Aggregation field is not included in the SIG-A field.

The Space-Time Block Coding (STBC) field indicates whether STBC is applied to the SU frame or the MU frame.

The Coding field indicates a coding scheme used for the SU frame or the MU frame. A Binary Convolutional Code (BCC) or Low Density Parity Check (LDPC) scheme may be used for the SU frame. In the MU frame, an independent coding scheme per user may be applied and, to support this scheme, the Coding field may be defined by a size of 2 bits or more.

The Short Guard Interval (SGI) field indicates whether an SGI is used for PSDU transmission of the SU frame or the MU frame. If the SGI is used for the MU frame, this may indicate that the SGI is commonly applied to all users belonging to an MU-MIMO group.

The Group Identifier (GID) field indicates MU group information in the MU frame. In the SU frame, since a user group does not need to be defined, the GID field is not included in the SIG-A field.

The number-of-space/time-streams (Nsts) field indicates the number of spatial streams in the SU frame or the MU frame. In the MU frame, the Nsts field indicates the number of spatial streams for each of STAs belonging to an MU group and, for this purpose, 8 bits are needed. Specifically, a maximum of four users may be included in one MU group and a maximum of four spatial streams can be transmitted to each user. To correctly support this, 8 bits are needed.

The partial AID (PAID) field indicates the ID of an STA for identifying a reception STA in the SU frame. In an uplink (UL) frame, the value of a PAID may be composed of part of a Basic Service Set ID (BSSID). In a downlink (DL) frame, the value of the PAID may be set to a resultant value of hashing an AID of an STA. For example, the BSSID may have a length of 48 bits, the AID may have a length of 16 bits, and the PAID may have a length of 9 bits.

Alternatively, in the UL subframe, the PAID may be set to a resultant value of hashing part of the BSSID and, in the DL subframe, the PAID may be set to a resultant value of hashing part of the AID and part of the BSSID.

The Acknowledgement (ACK) Indication field of Table 1 indicates the type of ACK transmitted after the SU frame or the MU frame. For example, if the ACK Indication field is set to 00, this may indicate normal ACK and, if it is set to 01, this may indicate block ACK. If the ACK Indication field is set to 10, this may indicate no ACK. It should be noted that the type of ACK is not always limited to three types and may be classified into more than three types according to attributes of a response frame.

Although not included in Table 1, the SIG field may include a DL/UL Indication field (e.g. a 1-bit size) for explicitly indicating whether a corresponding frame is a DL frame or a UL frame. The DL/UL Indication field may be defined only in the SU field and may not be defined in the MU frame so that the MU frame may be predetermined to always be used only as the DL frame. Alternatively, the DL/UL Indication field may be included regardless of the SU frame or the MU frame.

Meanwhile, in the MU frame as illustrated in FIG. 12, the SIG-B field may include user-specific information. Table 2 exemplarily shows fields constituting the SIG-B field in the MU frame. Table 2 also exemplarily shows various parameters applied to a PPDU in a bandwidth of 2, 4, 8, or 16 MHz.

TABLE 2

| | BW | | | |
|---|---|---|---|---|
| | 2 MHz | 4 MHz | 8 MHz | 16 MHz |
| MCS | 4 | 4 | 4 | 4 |
| Tail | 6 | 6 | 6 | 6 |
| CRC | 8 | 8 | 8 | 8 |
| Reserved | 8 | 9 | 11 | 11 |
| Total | 26 | 27 | 29 | 29 |

In Table 2, the MCS field indicates an MCS value of the PPDU transmitted in the form of the MU frame to each user.

The Tail field may be used to return an encoder to the state of 0.

The Cyclic Redundancy Check (CRC) field may be used to detect errors in an STA that receives the MU frame.

Bandwidth Selection Scheme for S1G Immediate Response Frame

The present invention proposes a method for selecting the bandwidth of an immediate response frame in a WLAN system operating in an S1G frequency band (e.g. 902 to 928 MHz).

When a transmission STA transmits a control frame or a data frame and a reception STA that has received the data frame transmits a response frame to the transmission STA after a Short Inter Frame Space (SIFS), the response frame is referred to as an immediate response frame.

The SIFS is determined as the value of aRxRFDelay+ aRxPLCPDelay+aMACProcessingDelay+aRxTxTurn-aroundTimer. aRxRFDelay indicates a radio frequency propagation delay. aRxPLCPDelay indicates a PLCP reception delay and aMACProcessingDelay indicates a processing delay for event handling in MAC. aRxTxTurnaround-Timer indicates a turnaround time necessary to switch from a reception (Rx) mode to a transmission (Tx) mode.

An immediate response scheme may operate as follows by way of example. The transmission STA may transmit a data frame and the reception STA that has successfully received the data frame may transmit an ACK frame after an SIFS. The transmission STA may transmit an RTS frame and the reception STA may transmit a CTS frame after the SIFS as a response to the RTS frame. In addition, the transmission STA may transmit a Power Save-Poll (PS-Poll) frame and the reception STA may transmit may transmit an ACK frame or a buffered data frame after the SIFS as a response to the PS-Poll frame.

In relation to the immediate response scheme, an ACK procedure ow now be specifically described as an example.

Figure 13:
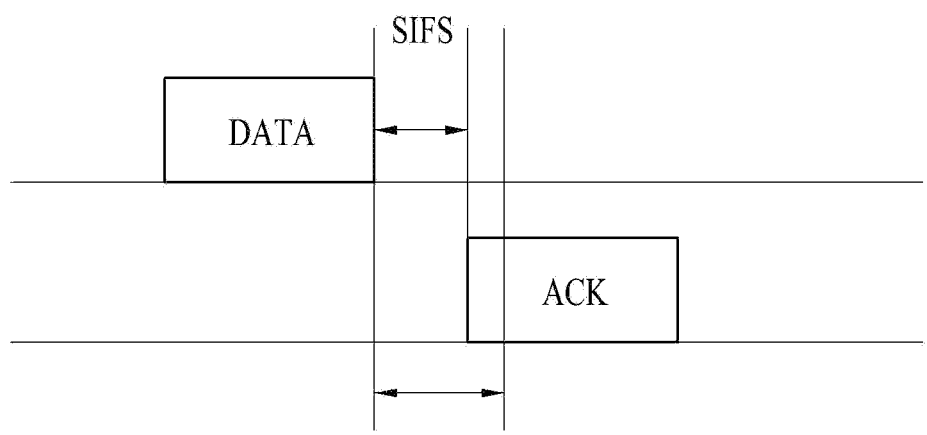
FIG. 13 is a diagram for explaining an ACK procedure.

FIG. 13 is a diagram for explaining an ACK procedure.

After transmitting an MPDU which requires an ACK frame as a response, an STA waits for an ACKTimeout interval. ACKTimeout may be determined based on the value of aSIFSTime+aSlotTime+aPHY-RX-START-Delay and starts at the value of a PHY-TXEND.confirm primitive. In this case, aSIFSTime indicates a nominal time required when a MAC layer and a PHY layer receive the last symbol of a frame on an air interface, process the frame, and transmit the first symbol of the earliest response frame available on the air interface. aSlotTime is a time unit used by the MAC layer to define a Point Coordination Function (PCF) Interframe Space (PIFS) and a DIFS. aPHY-RX-START-Delay indicates a delay time up to a time when a PHY-RXSTART.indication primitive is issued. The PHY-RXSTART.indication primitive is a primitive through which the PHY layer informs a local MAC layer that a PLCP starts to receive a PPDU having a valid PLCP header.

In FIG. 13, ACKTimeout is simplified as ACKTimeout=SIFS+Slot Time+PHY-RX-START-Delay. That is, ACKTimeout may be a time necessary for an STA that has received a data frame to transmit an ACK frame after an SIFS and may be calculated in consideration of a slot time.

The slot time is determined to be the value of aCCATime+ aRxTxTurnaroundTime+aAirPropagationTime+aMACProcessingDelay. aCCATime indicates a maximum time during which an STA is capable of accessing a medium in every time slot in order to determine whether the medium is in a busy state or an idle state according to a CCA mechanism. aRxTxTurnaroundTimer indicates a turnaround time necessary to switch from an Rx mode to a Tx mode. aAirPropagationTime indicates a double time of a time consumed when a signal is propagated up to a maximum distance with the most distant available STA among slot-synchronized STAs. aMACProcessingDelay indicates a processing delay for event handling in the MAC layer.

Among the factors for determining ACKTimeout, PHY-RX-START-Delay is a time for confirming whether an immediate response frame such as an ACK frame has successfully been triggered and generally considers a time consumed until an SIG field of a PLCP header is decoded.

In other words, a maximum time until the PLCP header of the ACK frame transmitted by the reception STA is transmitted to the transmission STA under the assumption that the transmission STA transmits a Data frame and the reception STA has successfully received the Data frame is used as ACKTimeout.

If no PHY-RXSTART.indication primitive occur during an ACKTimeout interval, an STA concludes that transmission of the MPDU has failed and invokes a backoff procedure upon expiration of the ACKTimeout interval.

If the PHY-RXSTART.indication primitive occurs during the ACKTimeout interval, an STA may wait for the PHY-RXEND.indication primitive to determine whether MPDU transmission is successful. The PHYRXEND.indication primitive is a primitive through which the PHY layer informs the MAC layer that reception of a current PSDU is completed.

If a valid ACK frame transmitted by the receiving STA, corresponding to the PHYRXEND.indication primitive is recognized, this may be interpreted as successful ACK. Then, a frame sequence may be permitted to continue or may be ended without retries according to a scheme suitable for a specific frame sequence in progress.

If other frames including another valid frame are recognized, this is interpreted as failure of MPDU transmission. In this case, the STA needs to invoke the backoff procedure in the PHY-RXEND.indication primitive and may process the received frame. Exceptionally, if a valid data frame transmitted by the receiving side of a PS-Poll frame is recognized, this may be interpreted as successful ACK for the PS-Poll frame.

In summary, an STA that has transmitted the data frame waits for ACK to be transmitted by an STA that receives the data frame, regards transmission of the data frame as failure when the PHY-RXSTART.indication primitive is not generated during the ACKTimeout interval, and then and performs a recovery procedure (i.e. a process of re-performing the backoff procedure and attempting to retransmit the data frame).

As illustrated in FIG. 13, PHY-RX-START-Delay is considered in determining the value of ACKTimeout. PHY-RX-START-Delay may differ according to the channel bandwidth of a frame. For example, PHY-RX-START-Delay in the S1G 1 MHz frame format as shown in FIG. 10 and PHY-RX-START-Delay in the frame format of S1G greater than or equal to 2 MHz as shown in FIG. 11 or FIG. 12 may differ.

In order to compare the length of PHY-RX-START-Delay according to channel bandwidth, it is assumed as described above that PHY-RX-START-Delay is a time consumed until the SIG field of the PLCP header is decoded.

In the case of a PPDU of 1 MHz, STF, LTF1, and SIG fields of the PLCP header include a total of 14 OFDM symbols. Assuming that a slot time of one OFDM symbol is about 40 µs, PHY-RX-START-Delay for the 1 MHz PPDU is about 560 µS(=14×40 µs).

In the case of a PPDU greater than or equal to 2 MHz (i.e. 2, 4, 8, or 16 MHz), the STF, LTF1, and SIG-A fields of the PLCP header include a total of 6 OFDM symbols. Accordingly, PHY-RX-START-Delay for the 2 MHz PPDU is approximately 240 µs (=6×40 µs).

Therefore, ACKTimeout needs to be differently set according to whether the immediate response frame is transmitted in the 1 MHz PPDU or the PPDU greater than or equal to 2 MHz. For instance, if the immediate response frame transmitted by the reception STA is the 1 MHz PPDU, ACKTimeout of the transmission STA needs to be much greater than the PPDU greater than or equal to 2 MHz.

If one fixed ACKTimeout value is used irrespective of the channel bandwidth of the immediate response frame, PHY-RX-START-Delay should be set to at least 560 µs (or 560 µs+delay margin) as a default value. In this case, if the immediate response frame transmitted by the reception STA is the PPDU greater than or equal to 2 MHz, ACKTimeout is not problematic because ACKTimeout is set in consideration of 560 µs which is necessary when the transmission STA decodes fields including an SIG field of the immediate response frame. However, if the immediate response frame transmitted by the reception STA is the 1 MHz PPDU, ACKTimeout is set in further consideration of unnecessary 320 µs in addition to a time which is necessary for the transmission STA to decode the fields including the SIG field of the ilmmediate response frame. Then, time consumption or unnecessary time delay corresponding to about 320 µs occurs in a recovery procedure (or backoff procedure) after transmission failure of the transmission STA and thus an inefficient problem occurs in terms of overall throughput and energy consumption.

For reference, assuming that one backoff slot time in the backoff procedure is 52 µs, since unnecessary overhead of 320 µs corresponds to a difference of about 6 times in a backoff timer (or backoff count value), this time difference may be interpreted as a significant time delay in terms of channel access efficiency of an actual STA.

Therefore, the present invention proposes a channel bandwidth selection scheme of an immediate response frame in a system supporting two or more types of channel bandwidths and an immediate response procedure based on the channel bandwidth selection method.

In the present invention, supporting channel bandwidths of two or more types means that information bits capable of being transmitted during a unit time (e.g. duration of one OFDM symbol) for each channel bandwidth when the same MCS is assumed differs or that the duration of a unit time (e.g. duration of one OFDM symbol) for each channel bandwidth is equal. Therefore, when a channel bandwidth of 20 MHz is down-clocked to 1/10 or 1/20, this is not included in the case of supporting channel bandwidths of two or more types.

In addition, in the present invention, a frame which triggers an immediate response frame is referred to as an immediate trigger frame. The immediate trigger frame may include, for example, a data frame having a normal ACK policy, an RTS frame, and a PS-Poll frame as in the aforementioned example. In this case, the immediate response frame may correspond to an ACK frame, a CTS frame, or a data frame.

An STA that transmits the immediate trigger frame may set an immediate response timer starting when transmission of the immediate trigger frame is completed. That is, the transmission STA may operate the immediate response timer during an aSIFSTime+aSlotTime+aPHY-RX-START-Delay time starting from an occurrence time of a PHY-TXEND.confirm primitive after transmission of the immediate trigger frame is completed.

If no PHY-RXSTART.indication primitive is generated until there is timeout in the immediate response timer, the transmission STA may conclude that the immediate response frame is not transmitted by the reception STA and perform a recovery procedure (or backoff procedure).

The immediate trigger frame is transmitted in the form of one of two or more PPDUs having different PHY-RX-START-Delay values according to channel bandwidth, as described previously.

For example, it is assumed that a PPDU using a first channel bandwidth (e.g. 1 MHz) has A as a PHY-RX-START-Delay value and a PPDU using a second channel bandwidth, a third channel bandwidth, etc. (e.g. 2 MHz, 4 MHz, etc.) has B as the PHY-RX-START-Delay value. It is assumed that A and B are set to different values and A is greater than B.

According to the present invention, in the viewpoint of the reception STA, the channel bandwidth of a PPDU to be used as an immediate response frame should be determined such that the PHY-RX-START-Delay value determined based on the PPDU to be used as the immediate response frame is equal to or less than the PHY-RX-START-Delay value determined based on a PPDU of a received immediate trigger frame.

For instance, if the transmission STA transmits the immediate trigger frame using a first channel bandwidth, the reception STA may transmit the immediate response frame using the first channel bandwidth.

In addition, when the transmission STA transmits the immediate trigger frame using a second channel bandwidth or a third channel bandwidth, the reception STA should not use the first channel bandwidth upon transmitting the immediate response frame. In the viewpoint of the reception STA, the channel bandwidth of the PPDU to be used as the immediate response frame should be determined such that the PHY-RX-START-Delay value determined based on the PPDU to be used as the immediate response frame is equal to or less than B which is the PHY-RX-START-Delay value determined based on the PPDU of the received immediate trigger frame. If the transmission STA transmits the immediate trigger frame using the second channel bandwidth or the third channel bandwidth, there is no problem when the reception STA transmits the immediate response frame using the second channel bandwidth or third channel bandwidth because the PHY-RX-START-Delay value is equal to B. However, if the reception STA transmits the immediate response frame using the PPDU of the first channel bandwidth, the PHY-RX-START-Delay value becomes A which is greater than B.

Additionally, if the immediate response frame is transmitted using a PPDU of channel bandwidths (e.g. second channel bandwidth, third channel bandwidth, etc.) having the same PHY-RX-START-Delay value, the channel bandwidth of the immediate response frame should be equal to or less than the channel bandwidth of the immediate trigger frame.

If the above rule is applied when the reception STA selects the channel bandwidth of the immediate response frame, the transmission STA that has transmitted the immediate trigger frame sets the immediate response timeout value of an immediate response timer to aSIFSTime+aSlotTime+aPHY-RX-START-Delay. aPHY-RX-START-Delay is set to an aPHY-RX-START-Delay value of the immediate trigger frame transmitted by the transmission STA. This means that the immediate response timeout value may vary with the channel bandwidth of the immediate trigger frame transmitted by the transmission STA.

An example of applying the immediate response procedure defined in the present invention to an S1G WLAN system (or a system conforming to the IEEE 802.11ah standards) will be described hereinbelow.

After transmitting an MPDU which requires an ACK frame as a response, an STA waits during an ACKTimeout interval. ACKTimeout may be determined based on the value of aSIFSTime+aSlotTime+aPHY-RX-START-Delay and starts at the value of PHY-TXEND.confirm primitive.

In this case, aPHY-RX-START-Delay is determined by a CH_BANDWIDTH (or preamble type) parameter of TXVECTOR. If the CH_BANDWIDTH parameter of TXVECTOR corresponds to (duplicated) 1 MHz, aPHY-RX-START-Delay is set to 601 μs. If the CH_BANDWIDTH parameter of TXVECTOR corresponds to (duplicated) 2 MHz/4 MHz/8 MHz/16 MHz, aPHY-RX-START-Delay is se to 281 μs.

An S1G STA that transmits a control frame (i.e. a response frame) in response to a frame transmitted through an S1G PPDU may be configured such that the same channel bandwidth as a channel bandwidth indicated by an RXVECTOR parameter CH_BANDWIDTH of a frame which elicits the response frame is indicated by a TXVECTOR parameter CH_BANDWIDTH.

In addition, the S1G STA is not permitted to transmit a 1 MHz preamble as a response to a preamble greater than or equal to 2 MHz (>=2 MHz preamble).

Figure 14:
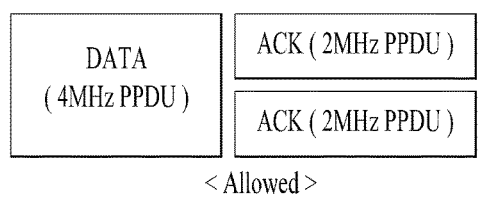
FIG. 14 is a diagram for explaining whether a frame exchange sequence is allowed according to the present invention.
Figure 14:
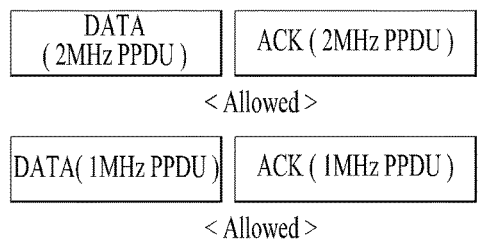
Figure 14:
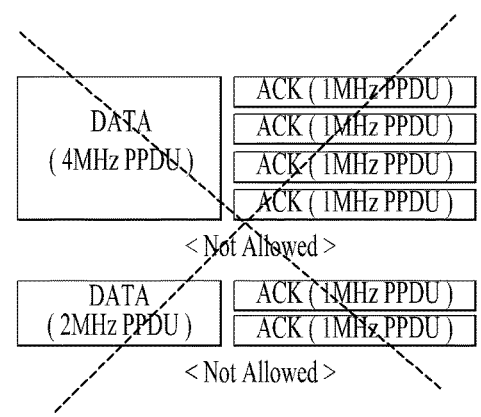

FIG. 14 is a diagram for explaining whether a frame exchange sequence is allowed according to the present invention.

In FIG. 14, an operation for receiving an ACK frame after data frame transmission is illustrated. FIG. 14(a) illustrates the case in which reception of the ACK frame is allowed and FIG. 14(b) illustrates the case in which reception of the ACK frame is not allowed.

As illustrated in FIG. 14(a), an ACK frame of a duplicated 2 MHz PPDU is allowed to be received after a data frame of a 4 MHz PPDU is transmitted. In addition, an ACK frame of a 2 MHz PPDU is allowed to be received after a data frame of a 2 MHz PPDU is transmitted. An ACK frame of a 1 MHz PPDU is also allowed to be received after a data frame of a 1 MHz PPDU is transmitted.

Meanwhile, as illustrated in FIG. 14(b), an ACK frame of a duplicated 1 MHz PPDU is not allowed to be received after a data frame of a 4 MHz PPDU is transmitted. In addition, an ACK frame of a duplicated 1 MHz PPDU is not allowed to be received after a data frame of a 2 MHz PPDU is transmitted.

An STA that has transmitted a data frame of a channel bandwidth of 2 MHz or 4 MHz expects a PPDU having a preamble of a 2 MHz channel bandwidth as a response frame to the data frame, regards aPHY-RX-START-Delay as about 281 μs to calculate a timeout value, and receives and processes the response frame.

If a response frame of a PPDU having a preamble of a 1 MHz channel bandwidth is received in response to a data frame of a 2 MHz or 4 MHz channel bandwidth as illustrated in FIG. 14(b), a timeout value for correctly decoding the response frame should be calculated based on aPHY-RX-START-Delay of about 601 μs. However, since a transmission STA calculates the timeout value based on aPHY-RX-START-Delay of about 281 μs and receives and processes the response frame, the transmission STA cannot correctly receive the response frame.

In the foregoing various examples of the present invention, the values of aPHY-RX-START-Delay such as 601 μs or 281 μs are purely exemplary and are provided only for clarity of description. Therefore, the scope of the present invention is not limited to such a specific number.

VCS Mechanism

A Carrier Sense (CS) mechanism is used for channel access and refers to an operation for determining a busy/idle state of a corresponding channel.

An existing NAV configuration scheme determines that a channel is being used by another STA during a prescribed duration, based on a duration field of a frame received by any STA from another STA and performs an operation (i.e. medium access is not attempted during the prescribed duration) according to the determined result. This operation may be referred to as a Virtual CS (VCS) mechanism because a corresponding medium seems to be determined to be occupied as a result of performing CS (even though the medium is physically in an idle state) as compared with determination as to whether the medium is occupied by performing physical CS.

For example, third party STAs, other than a destination STA of a received frame, determines that the received frame has an error when a CRC value of the received frame is invalid. STAs that receive a frame having an error may wait during an Extended Inter-Frame Space (EIFS) and then resume a backoff procedure when a channel is in an idle state. Generally, the EIFS is calculated based on aSIF-STime+DIFS+ACKTxTime.

In this case, ACKTxTime indicates a time required by an STA to transmit an ACK frame. According to the above-described bandwidth selection scheme of a response frame proposed in the present invention, the channel bandwidth of the ACK frame is determined depending on the channel bandwidth of a frame (e.g. an immediate trigger frame) that invokes the ACK frame. For example, if the immediate trigger frame has a preamble type of 2 MHz or greater, the immediate response frame does not allow a 1 MHz preamble type. In addition, the preamble channel bandwidth type of the immediate response frame is configured to be the same as the preamble channel bandwidth type of the immediate trigger frame.

Therefore, upon receiving an erroneous frame, third party STAs need to confirm the channel bandwidth of a received frame in order to defer channel access during the EIFS. If a PPDU received through a first channel bandwidth has an error, ACKTxTime of the EIFS is calculated by assuming the value of aPHY-RX-START-Delay for the same channel bandwidth as the first channel bandwidth (as described above, aPHY-RX-START-Delay is a time for identifying whether the immediate response frame such as an ACK frame has successfully been triggered and usually considers a time consumed until an SIG field of a PLCP header is decoded).

This is because the ACK frame for the PPDU received through the first channel bandwidth is also transmitted using the first channel bandwidth and the value of aPHY-RX-START-Delay for the first channel bandwidth should be applied to the ACK frame. If a second channel bandwidth or a third channel bandwidth, other than the first channel bandwidth, has an error, ACKTxTime of the EIFS is calculated by assuming the value of aPHY-RX-START-Delay for the second channel bandwidth or the third channel bandwidth.

If the CRC value of the received frame is valid, the third party STAs, other than the destination STA of the received frame, determine that the received frame has no errors. STAs that have received an error-free frame set an NAV during a time corresponding to a value indicated by a duration field included in a MAC header of the received frame. A duration field of a MAC header in any frame is set to a value indicating a frame transmission time for protecting frame(s) which are to be subsequently transmitted.

Meanwhile, a frame such as a short MAC frame does not include the duration field in the MAC header in order to reduce MAC header overhead. Accordingly, the scheme for setting the NAV using the duration field as described above cannot be applied.

In any case where a short MAC frame is received or a normal MAC frame is received, information about subsequently transmitted frame(s) needs to be transmitted through a part other than the MAC header in order for an STA to correctly set the NAV value.

Unlike the existing VCS mechanism for setting the NAV value based on the duration field of the received frame, a VCS mechanism proposed in the present invention operates based on specific information other than the duration field. Therefore, a value which is set based on specific information of a received frame as proposed in the present invention (i.e. a value set by a purpose similar to the existing NAV value) is referred to a "VCS time length value" in that the value is a time duration during which a channel is determined to be in a busy state as the result of VCS. However, the concept of the VCS time length value proposed in the present invention does not exclude setting the NAV value based on information other the duration field.

For example, the NAV value (or VCS time length value) may be set using a response frame type field (this field may be referred to as an ACK indication parameter or a response indication parameter) in a PLCP SIG field of any frame. For instance, since the type of a subsequent frame can be known according to indication of the response frame type parameter of any frame, if the frame includes the duration field, the value of the duration field may be assumed and the NAV value (or VCS time length value) may be determined based on the assumed value. Obviously, the value of the duration field is not necessarily needed to be predicted/assumed and is used to aid in understanding the present invention in comparison with the existing NAV configuration mechanism.

The response frame type parameter may be configured to indicate one of types such as No Response, NDP Control Response, Normal Control Response, Long response, etc.

FIG. 15 is a diagram for explaining an example of the present invention using a response frame type field of an SIG field of a PLCP header.

In the example of FIG. 15, a response frame type field (or response indication parameter) out of information included in an SIG field of a PLCP header of a Data frame may be set to a value indicating any one of No Response, NDP Control Response, Normal Control Response, and Long Response according to the type of an ACK frame which is transmitted subsequent to the Data frame.

If the response frame type is No Response, it may be estimated/assumed that the value of a duration field of a MAC header of a received frame will be 0 if present. Accordingly, if the value of the response indication parameter indicates No Response, an NAV value (or VCS time length value) is set to 0.

If the response frame type is NDP Control Response, it may be estimated/assumed that the value of the duration field of the MAC header of the received frame will be the value of PLCP header transmission time+SIFS (PLCP header transmission time plus SIFS) if present. Since an NDP frame indicates a frame composed only of the PLCP header, the PLCP header transmission time may be expressed as an NDP frame transmission time (i.e. NDPTxTime). Therefore, if the value of the response indication parameter indicates NDP Control Response, the NAV value (or VCS time length value) is set to NDPTxTime+aSIFSTime.

If the response frame type is Normal Control Response, it is estimated/assumed that the value of the duration field of the MAC header of the received frame will be the value of CTS/ACK/block ACK transmission time+SIFS (CTS/ACK/BlockACK transmission time plus SIFS) if present. Since CTS/ACK/BlockACK frame transmission corresponds to a normal frame, the CTS/ACK/block ACK transmission time may be expressed as a normal frame transmission time (i.e. NoramlTxTime). Therefore, if the value of the response indication parameter indicates Normal Control Response, the NAV value (or VCS time length value) is set to NormalTxTime+aSIFSTime.

If the response frame type is Long Response, it is estimated/assumed that the value of the duration field of the MAC header of the received frame will be the value of maximum PPDU transmission time+SIFS (MAX PPDU transmission time plus SIFS) if present in order to indicate any response frame. Accordingly, if the value of the response indication parameter indicates Long Response, the NAV value (or VCS time length value) is set to MaxPPDUTxTime+aSIFSTime.

In this way, although the type of a frame to be subsequently transmitted may be estimated/assumed through information about the response frame type included in the received frame, the transmission time length of a response frame should be determined in order for a third party STA to correctly set the NAV value (or VCS time length value). This is because the transmission time of each frame differs according to channel bandwidth.

Specifically, in order for the third party STA to set the NAV value (or VCS time length value), the transmission time length of an MPDU part of the response frame and the transmission time length of a preamble part of the response frame should be correctly determined.

The transmission time length of the MPDU part of the response frame is determined based on the response frame type of the PLCP SIG field of the received frame. For example, if the response frame type indicates any one of No Response, NDP Control Response, Normal Control Response, and Long Response, an MPDU value is determined according to the indicated type.

The transmission time length of the preamble part of the response frame is determined by channel bandwidth. For example, in the preamble type of a 1 MHz channel bandwidth and the preamble type of a channel bandwidth greater than or equal to 2 MHz, the time length of the preamble part of the response frame is differently/separately determined (refer to FIGS. 10 to 12). In addition, the channel bandwidth of the response frame is determined by the channel bandwidth of a frame received by a third party STA.

Consequently, the NAV value (or VCS time length value) set by the third party STA is determined by the channel bandwidth of the response frame (or the preamble type of the response frame determined according to the channel bandwidth of the received frame) and the value of the response frame type field (or response indication parameter value) included in the PLCP header of the received frame. In other words, the response frame type is determined based on the value of the response frame type field (or response indication parameter value) included in the PLCP header of a frame received by the third party STA, the length/type of the preamble in the response frame type is determined by the channel bandwidth of the received frame, and the NAV value (or VCS time length value) including a time necessary to transmit the response frame may be determined based on the channel bandwidth and the value of the response frame type. Then, the third party STA can correctly set the NAV value (or VCS time length value) without distinguishing between the types of received frames (e.g. a short MAC frame or other frames (i.e. a frame without a duration field or a frame with a duration field)).

In implementing the above-described VCS mechanism, the STA may design a protocol using one parameter (e.g. NAV value (or VCS time length value)) or design a protocol distinguished by a separate parameter according to information (e.g. the duration field of the MAC header or the response frame type field of the PLCP header) used as a basis to determine the VCS time length value. In the foregoing example of the present invention, although one parameter (i.e. NAV value or VCS time length value) is used to implement the VCS mechanism, the case in which the NAV value is be set based on the value of the duration field as in a conventional scheme and an additional VCS time length value is set based on the value of the response frame type field (also based on channel bandwidth) is included in the embodiment of the present invention.

Third Party STA Determination Scheme

In a frame such as a short MAC frame, an AID (the AID is a local ID allocated by an AP to an associated STA) rather than a MAC address may be used in a portion of a Receiver Address (RA) field and a Transmitter Address (TA) field in order to reduce MAC header overhead. For example, a MAC header of a UL short MAC frame transmitted by an STA to an AP includes the MAC address of the AP in an RA field (e.g. Address 1 (A1) field) and includes the AID of the STA in a TA field (e.g. Address 2 (A2) field). In contrast, a MAC header of a DL short MAC frame transmitted by the AP to the STA includes the AID of the STA in the RA field (or A1 field) and includes the MAC address of the STA in the TA field (or A2 field). Since the MAC address is defined by a length of 6 bytes and the AID is defined by a length of 2 octets, MAC header overhead corresponding to the difference in length can be reduced.

Whether STAs that have received the short MAC frame set NAV values (or VCS time length values) is determined according to whether the STAs are destination STAs of the corresponding frame. Third party STAs, other than the destination STAs, regard the received frame as an error-free frame when a CRC value of the received frame is valid and STAs that have received the error-free frame set NAV values (or VCS time length values).

If an STA receives a frame, whether the STA is the destination STA of the frame should be determined.

If the RA of the short MAC frame received by the STA is composed of the MAC address, the STA compares the RA with a MAC address thereof. If the addresses are equal, the STA may determine that it is a destination STA and, otherwise, the STA may determine that it is a third party STA.

If the RA of the short MAC frame received by the STA is composed of an AID, the STA compares the RA with an AID thereof. If the addresses are different, the STA may determine that it is a third party STA.

Meanwhile, if the RA of the short MAC frame received by the STA is composed of an AID, the STA should not determine that it is a destination STA even though the RA is equal to the AID of the STA as a result of comparison. This is because, even when the AID values are equal, if APs that allocate the AID values are different, destination STAs of the frame may differ. Accordingly, if the RA of the short MAC frame received by the STA is composed of an AID, the STA compares the RA with an AID thereof. If the addresses are equal, the STA compares a TA of the short MAC frame with a MAC address of an AP associated therewith. If the TA of the short MAC frame received by the STA is equal to the MAC address of the AP with which the STA is associated, the STA may determine that it is a destination STA and, otherwise, the STA may determine that it is a third party STA.

If the STA receives the short MAC frame in a state in which the STA is associated with no APs (i.e. a pre-association state), the above scheme of determining whether the STA is a destination STA or a third party STA based on an RA value composed of an AID and a TA value composed of a MAC address is not applied. This is because an AP cannot transmit the short MAC frame (i.e. a MAC frame in which either an RA field or a TA field is composed of an AID) to an STA with which the AP is not associated. Accordingly, if an STA receives the short MAC frame in a pre-association state, the STA should determine that it is not a destination STA but a third party STA.

Thus, if an STA that has received a frame determines that it is a third party STA, the STA may set the NAV value (or VCS time length value) according to a specific field of a received frame as described in the present invention.

Additionally, even when any STA should determine whether it is an STA that should transmit an immediate response frame (e.g. ACK frame transmitted in response to a short MAC data frame), the above-described third party STA determination scheme may be applied. For example, if an RA of the short MAC data frame received by an STA is equal to an AID of the STA, the STA may additionally compare a TA with a MAC address of an AP with which the STA is associated and determine that it is a destination STA only when the addresses are equal. Next, the STA may transmit the immediate response frame.

That is, in the case in which the RA of the received short MAC frame corresponds to an AID, the STA compares the RA with an AID thereof. If the RA is equal to the AID of the STA, the STA compares a TA with a MAC address. The STA determines that it is the destination STA and transmits the immediate response frame such as the ACK frame, only when the TA of the received short MAC frame is equal to the MAC address of an AP with which the STA is associated.

Figure 16:
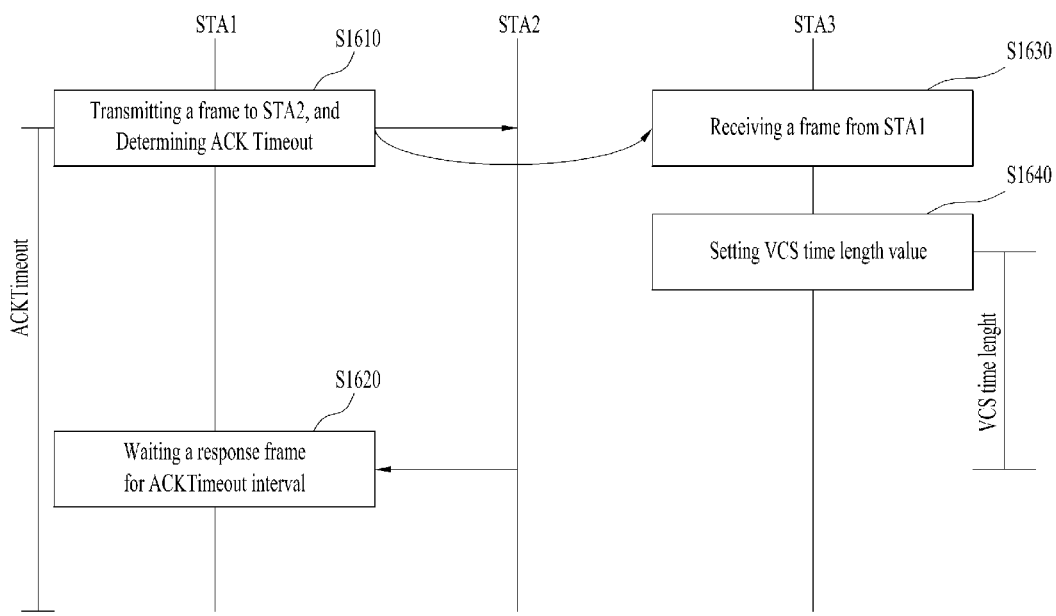
FIG. 16 is a diagram for explaining an exemplary method of the present invention.

FIG. 16 is a diagram for explaining an exemplary method of the present invention.

In the example of FIG. 16, the operation of a first STA STA1 relates to the above-described bandwidth selection scheme (or response procedure) for the S1G immediate response frame of the present invention. In addition, in the example of FIG. 16, the operation of a third STA STA3 relates to the VCS mechanism of the present invention. The operations of the STAs may be understood as separate operations although a description is given with reference to one drawing for convenience of description.

In step S1610, the first STA STA1 may transmit a frame to the second STA STA2. This frame may be an immediate trigger frame transmitted by an immediate response scheme. The STA2 that has received the frame from the STA1 may transmit a response frame (e.g. an immediate response frame).

In this case, the channel bandwidth type of the response frame transmitted by the STA2 may be configured to be the same as the channel bandwidth type of the frame transmitted by the STA1. If the frame transmitted by the STA1 has a preamble type of 2 MHz or more, the response frame transmitted by the STA2 may be limited to a type other than a 1 MHz preamble type (i.e. the 1 MHz preamble type is not allowed).

Additionally, in step S1610, the STA1 may wait for the response frame to be transmitted by the STA2 during an ACKTimeout interval. The ACKTimeout interval is determined as a different value according to the preamble channel bandwidth type of the frame. In other words, since the preamble channel bandwidth of the response frame differs according to the preamble channel bandwidth of the frame, the ACKTimeout interval may be set in consideration of the preamble channel bandwidth of the frame.

In step S1620, the STA1 may receive the response frame from the STA2. If the response frame is received within the ACKTimeout interval, it is determined that the frame has successfully been transmitted and, otherwise, it is determined that transmission of the frame fails. If the ACKTimeout interval has elapsed, the STA1 may perform a backoff procedure (not shown).

Meanwhile, as in step S1630, a third party STA (e.g. STA3) may receive the frame transmitted by another STA (e.g. STA1) to still another STA (e.g. STA2).

In step S1640, the STA3 may receive an NAV value (or a VCS time length value) based on a response indication parameter (or a response frame type field) and/or a channel bandwidth type of the received frame. The STA3 may defer channel access during a time corresponding to the NAV value (or VCS time length value).

The channel bandwidth type indicates the channel bandwidth type of the response frame. The channel bandwidth type of the response frame may be set to be the same as the channel bandwidth type of the frame (e.g. frame transmitted from STA1 to STA2).

For example, the NAV value (or VCS time length value) is basically determined according to which of No Response, Normal Response, NDP Response, and Long Response the response indication parameter indicates. Additionally, the NAV value (or VCS time length value) may be specifically determined according to channel bandwidth.

While the exemplary method illustrated in FIG. 16 is represented as a series of steps for simplicity of description, this does not limit the order of the steps. As needed, some steps may be performed at the same time or in a different order. Further, all of the steps illustrated in FIG. 16 are not necessarily needed to implement the proposed method of the present invention.

The method of the present invention illustrated in FIG. 16 may be performed by implementing the foregoing various embodiments of the present invention independently or in combination of two or more thereof.

Figure 17:
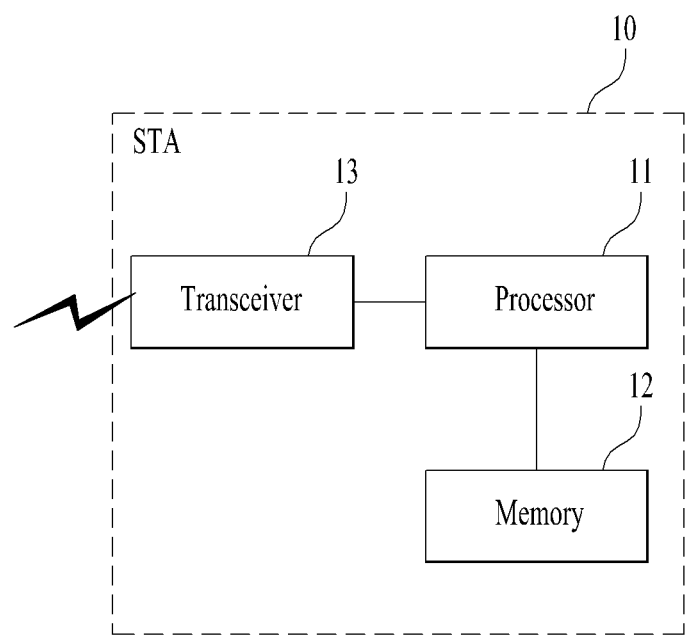
FIG. 17 is a block diagram of a wireless apparatus according to an embodiment of the present invention.

FIG. 17 is a block diagram of a wireless apparatus according to an embodiment of the present invention.

An STA 10 may include a processor 11, a memory 12, and a transceiver 13. The transceiver 13 may transmit/receive a wireless signal, for example, implement the physical layer of an IEEE 802 system. The processor 11 is connected to the transceiver 13 and implements the physical layer and/or the MAC layer of the IEEE 802 system. The processor 11 may be configured to perform operations according to the foregoing various embodiments of the present invention. Further, a module for performing operations according to the various embodiments of the present invention may be stored in the memory 12 and executed by the processor 11. The memory 12 may be located inside or outside the processor 11 and be connected to the processor 11 by a known means.

In FIG. 17, the STA 10 according to an embodiment of the present invention may be configured to perform a response process. The processor 11 may be configured to transmit a frame requiring a response frame to another STA through the transceiver 13. The processor 11 may be configured to wait for the response frame during an ACKTimeout interval. The ACKTimeout interval may be set to a different value according to the preamble channel bandwidth type of the frame.

The STA 10 of FIG. 17 according to another embodiment of the present invention may be configured to perform VCS. The processor 11 of a third STA may be configured to receive a frame transmitted from a first STA to a second STA through the transceiver 12. The processor 11 may be configured to determine a VCS time length value based on either a response indication parameter or a channel bandwidth type. The processor 11 may be configured to defer channel access caused by the third STA during a time corresponding to the VCS time length value.

The specific configuration of the above-described apparatus may be implemented so that the foregoing various embodiments of the present invention may be applied independently or two or more thereof may be applied simultaneously. A repeated description is omitted for clarity.

The embodiments of the present invention may be implemented by various means, for example, hardware, firmware, software, or a combination thereof.

In a hardware configuration, the methods according to the embodiments of the present invention may be implemented by one or more Application Specific Integrated Circuits (ASICs), Digital Signal Processors (DSPs), Digital Signal Processing Devices (DSPDs), Programmable Logic Devices (PLDs), Field Programmable Gate Arrays (FPGAs), processors, controllers, microcontrollers, or microprocessors.

In a firmware or software configuration, the method according to the embodiments of the present invention may be implemented in the form of modules, procedures, functions, etc. performing the above-described functions or operations. Software code may be stored in a memory unit and be executed by a processor. The memory unit may be located at the interior or exterior of the processor and may transmit and receive data to and from the processor via various known means.

The detailed description of the preferred embodiments of the present invention has been given to enable those skilled in the art to implement and practice the invention. Although the invention has been described with reference to the preferred embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

While the various embodiments of the present invention have been described in the context of an IEEE 802.11 system, the present invention is also applicable to various mobile communication systems by the same scheme.

The invention claimed is:

1. A method for performing a response process in a wireless local access network (WLAN) system, the method comprising:
   transmitting, by a first station (STA), a frame requiring a response frame to a second STA;
   waiting, by the first STA, for the response frame during an ACKTimeout interval configured differently according to whether a preamble channel bandwidth type of the frame is a 1 MHz preamble type or is a 2 MHz or more preamble type; and
   determining, by the first STA, that transmission of the frame has failed and performing, by the first STA, a backoff procedure, when the ACKTimeout interval is ended,
   wherein the configured ACKTimeout interval is determined based on a value of an aPHY-RX-START-Delay set to a different value according to whether the preamble channel bandwidth type of the frame is the 1 MHz preamble type or is the 2 MHz or more preamble type, and
   wherein a preamble channel bandwidth of the response frame is set to a value equal to the preamble channel bandwidth type of the frame.

2. The method according to claim 1,
wherein, if the preamble channel bandwidth type of the frame is the 1 MHz preamble type, the ACKTimeout interval is calculated based on the aPHY-RX-START-Delay value for the 1 MHz preamble type,
wherein the aPHY-RX-S TART-Delay value indicates a delay time until a Physical Layer Convergence Procedure (PLCP) Packet Data Unit (PPDU) having a valid PLCP header starts to be received.

3. The method according to claim 1,
wherein, if the preamble channel bandwidth type of the frame is the 2 MHz or more preamble type, the ACKTimeout interval is calculated based on the aPHY-RX-START-Delay value for the 2 MHz or more preamble type,
wherein the aPHY-RX-START-Delay indicates a delay time until a Physical Layer Convergence Procedure (PLCP) Packet Data Unit (PPDU) having a valid PLCP header starts to be received.

4. The method according to claim 1,
wherein the frame is one of a data frame, a Request To Send (RTS) frame, and a Power Save-Poll (PS-Poll) frame.

5. The method according to claim 1,
wherein the response frame is one of an Acknowledgement (ACK) frame, a Clear To Send (CTS) frame, and a data frame.

6. The method according to claim 1,
wherein the STA is an STA operating in a Sub-1 GHz (S1G) frequency band.

7. The method according to claim 1, wherein a value of the aPHY-RX-START-Delay when the preamble channel bandwidth type of the frame is the 1 MHz preamble type is greater by 320 micro-seconds than a value of aPHY-RX-START-Delay when the preamble channel bandwidth type of the frame is the 2 MHz or more preamble type.

8. The method according to claim 1, wherein the backoff procedure includes a retransmission of the frame.

9. A station (STA) for performing a response process in a wireless local access network (WLAN) system, the STA comprising:
   a transceiver; and
   a processor,
   wherein the processor:
      controls the transceiver to transmit a frame requiring a response frame to a second STA through the transceiver;
      waits for the response frame during an ACKTimeout interval configured differently according to whether a preamble channel bandwidth type of the frame is a 1 MHz preamble type or is a 2 MHz or more preamble type; and
      determines that transmission of the frame has failed and performing, by the first STA, a backoff procedure, when the ACKTimeout interval is ended,
   wherein the configured ACKTimeout interval is determined based on a value of an aPHY-RX-START-Delay set to a different value according to whether the preamble channel bandwidth type of the frame is the 1 MHz preamble type or is the 2 MHz or more preamble type, and
   wherein a preamble channel bandwidth of the response frame is set to a value equal to the preamble channel bandwidth type of the frame.

10. The STA according to claim 9,
wherein, if the preamble channel bandwidth type of the frame is the 1 MHz preamble type, the ACKTimeout interval is calculated based on the aPHY-RX-START-Delay value for the 1 MHz preamble type, and
wherein the aPHY-RX-S TART-Delay value indicates a delay time until a Physical Layer Convergence Procedure (PLCP) Packet Data Unit (PPDU) having a valid PLCP header starts to be received.

11. The STA according to claim 9,
wherein, if the preamble channel bandwidth type of the frame is of the 2 MHz or more preamble type, the ACKTimeout interval is calculated based on the aPHY-RX-START-Delay value for the 2 MHz or more preamble type, and
wherein the aPHY-RX-START-Delay indicates a delay time until a Physical Layer Convergence Procedure (PLCP) Packet Data Unit (PPDU) having a valid PLCP header starts to be received.

12. The STA according to claim 9, wherein the frame is one of a data frame, a Request To Send (RTS) frame, and a Power Save-Poll (PS-Poll) frame.

13. The STA according to claim 9, wherein the response frame is one of an Acknowledgement (ACK) frame, a Clear To Send (CTS) frame, and a data frame.

14. The STA according to claim 9, wherein the STA is an STA operating in a Sub-1 GHz (S1G) frequency band.

15. The STA according to claim 9, wherein a value of the aPHY-RX-START-Delay when the preamble channel bandwidth type of the frame is the 1 MHz preamble type is greater by 320 micro-seconds than a value of aPHY-RX-START-Delay when the preamble channel bandwidth type of the frame is the 2 MHz or more preamble type.

16. The STA according to claim 9, wherein the backoff procedure includes a retransmission of the frame.

\* \* \* \* \*